US011920695B2

(12) United States Patent
Pierce et al.

(10) Patent No.: US 11,920,695 B2
(45) Date of Patent: *Mar. 5, 2024

(54) PORTABLE VALVE OPERATING MACHINE FOR USE IN EXERCISING VALVES HAVING A TORQUE MANAGEMENT SYSTEM

(71) Applicant: ILLINOIS TOOL WORKS INC., Glenview, IL (US)

(72) Inventors: Kenneth R. Pierce, Arlington Heights, IL (US); Michael W. Gearhart, Schaumburg, IL (US)

(73) Assignee: ILLINOIS TOOL WORKS, INC., Glenview, IL (US)

(*) Notice: Subject to any disclaimer, the term of this patent is extended or adjusted under 35 U.S.C. 154(b) by 368 days.

This patent is subject to a terminal disclaimer.

(21) Appl. No.: 17/174,008

(22) Filed: Feb. 11, 2021

(65) Prior Publication Data

US 2021/0254745 A1    Aug. 19, 2021

Related U.S. Application Data

(60) Provisional application No. 62/976,425, filed on Feb. 14, 2020, provisional application No. 62/976,405, filed on Feb. 14, 2020.

(51) Int. Cl.
*F16K 31/04* (2006.01)
*B25B 21/00* (2006.01)
(Continued)

(52) U.S. Cl.
CPC .......... *F16K 31/047* (2013.01); *B25B 21/002* (2013.01); *F16H 37/041* (2013.01); *E03B 7/09* (2013.01); *F16H 2702/02* (2013.01)

(58) Field of Classification Search
CPC ..... F16K 31/047; F16K 31/04; B25B 21/002; B25B 23/0078; B25B 23/0085;
(Continued)

(56) References Cited

U.S. PATENT DOCUMENTS 1,979,340 A    11/1934   Norman
4,994,001 A *   2/1991   Wilkinson .............. F16K 31/05
                                                     251/129.03
(Continued)

FOREIGN PATENT DOCUMENTS

DE         34 12 032 A1     12/1984
DE      20 2012 008347 U1     9/2012
EP         3 275 596 A1      1/2018

OTHER PUBLICATIONS

International Search Report for International Patent Application No. PCT/US2021/017774 dated Aug. 6, 2021, 4 pages.
(Continued)

*Primary Examiner* — David B. Thomas
(74) *Attorney, Agent, or Firm* — Klintworth & Rozenblat IP LLP

(57) ABSTRACT

A valve operating machine includes a base, a housing thereon and a motor within the housing, an output socket rotatably coupled to the housing and extending through the base, a ring lock rotatably coupled to the output socket, a locking assembly which locks the ring lock to the output socket and can be released to allow removal of the ring lock from the output socket, a plate rotatably coupled to the ring lock, and a mating assembly configured to couple the plate to the base in at least two positions, while preventing rotation of the plate relative to the base. A key that is used to exercise a valve can be connected to the output socket.

21 Claims, 32 Drawing Sheets

(51) Int. Cl.
*E03B 7/09* (2006.01)
*F16H 37/04* (2006.01)

(58) Field of Classification Search
CPC .. F16H 37/041; F16H 37/047; F16H 2702/02; F16H 1/46; E03B 7/09
See application file for complete search history.

(56) References Cited

U.S. PATENT DOCUMENTS

| | | |
|---|---|---|
| 5,339,239 A | 8/1994 | Manabe et al. |
| 5,361,996 A | 11/1994 | Svensson et al. |
| 5,381,996 A | 1/1995 | Arnemann et al. |
| 5,570,581 A * | 11/1996 | Preston ............... F16K 31/12 60/483 |
| 5,810,051 A | 9/1998 | Campagna et al. |
| 6,125,868 A | 10/2000 | Murphy et al. |
| 6,282,989 B1 | 9/2001 | Sorter |
| 7,334,606 B1 | 2/2008 | Hurley |
| 7,415,376 B1 | 8/2008 | Hurley |
| 7,604,023 B2 | 10/2009 | Buckner et al. |
| 7,703,473 B1 | 4/2010 | Hurley |
| 7,886,766 B2 | 2/2011 | Radomsky et al. |
| 8,864,101 B1 | 10/2014 | Buckner |
| 9,140,370 B2 | 9/2015 | Kannoo et al. |
| 11,326,706 B2 * | 5/2022 | Pierce ............... F16K 31/53 |
| 2004/0045414 A1 | 3/2004 | Reuschel |
| 2009/0267010 A1 * | 10/2009 | Ferrar ............... B25J 5/007 251/231 |
| 2012/0138830 A1 * | 6/2012 | Ferrar ............... F16K 31/12 251/248 |
| 2017/0067575 A1 * | 3/2017 | Preston ............... F16K 31/46 |
| 2018/0215019 A1 * | 8/2018 | Hooks ............... B25B 21/002 |
| 2020/0230827 A1 * | 7/2020 | Wozniak ............... F16K 31/46 |
| 2022/0243838 A1 | 8/2022 | Wozniak et al. |

OTHER PUBLICATIONS

Written Opinion for International Patent Application No. PCT/US2021/017774 dated Aug. 6, 2021 5 pages.
International Search Report for International Patent Application No. PCT/US2021/018024 dated Aug. 2, 2021, 7 pages.
Written Opinion for International Patent Application No. PCT/US2021/018024 dated Aug. 2, 2021, 7 pages.
Machine Translation of DE 3412032 A1.
Machine Translation of DE 202012008347 U1.

* cited by examiner

US 11,920,695 B2

PORTABLE VALVE OPERATING MACHINE FOR USE IN EXERCISING VALVES HAVING A TORQUE MANAGEMENT SYSTEM

This application claims the domestic benefit of U.S. Provisional Patent Application Ser. No. 62/976,405, filed on Feb. 14, 2020 and U.S. Provisional Patent Application Ser. No. 62/976,425, filed on Feb. 14, 2020, the contents of which are incorporated herein in its entirety.

FIELD OF THE INVENTION

The present disclosure generally relates to exercising valves.

BACKGROUND

Municipalities and the like have extensive networks of piping to control the flow of water from storage and pumping stations to users. The network of piping includes numerous valves such that portions of the network can be closed off as needed for service while the remainder of the network remains in operation. The piping required for such networks can range in size from as small as three or four inches in diameter to as large as three feet in diameter. Also, the valves of the system typically remain in an open condition or in a closed condition for very long periods of time.

The valves of a municipal water system are located below ground with an access shaft extending from the valve stem to the surface through which an elongate key is extended to turn the stem. Such valves typically include a screw that is rotatable through one hundred turns or more to fully open or fully close the valve. Also, underground valves undergo a certain degree of deterioration over time and it is common for valves to become frozen or locked into their current position as a result of contamination on the surface of the screw or deterioration of the parts. As a result, the large amount of torque needed to open and close such valves is provided by a motorized valve turning machine.

It has been found that a valve turning machine attached by a key to a valve and with torque applied to the key by the machine, the machine will shake and toss violently as the valve is exercised. The shaking and tossing are a result of the uneven torque applied to the key as the turning screw encounters areas of contamination by foreign materials and deterioration of the moving parts. The shaking and tossing of the machine include vertical components of force which cause the key to be pulled free of the valve stem, thereby interrupting the valve turning operation and perhaps causing damage to either the machine or the valve. To retain the machine and the key in their desired orientation with respect to the valve stem, the operator is required to grasp the machine with his/her arms and use his/her body weight to hold the machine in the desired orientation as the valve is exercised.

SUMMARY

The present disclosure is defined by the following claims, and nothing in this section should be taken as a limitation on those claims.

In one aspect, a portable valve operating machine for use in exercising valves is provided.

In another aspect, a valve operating machine includes a base, a housing thereon and a motor within the housing, an output socket rotatably coupled to the housing and extending through the base, a ring lock rotatably coupled to the output socket, a locking assembly which locks the ring lock to the output socket and can be released to allow removal of the ring lock from the output socket, a plate rotatably coupled to the ring lock, and a mating assembly configured to couple the plate to the base in at least two positions, while preventing rotation of the plate relative to the base. A key that is used to exercise a valve can be connected to the output socket.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
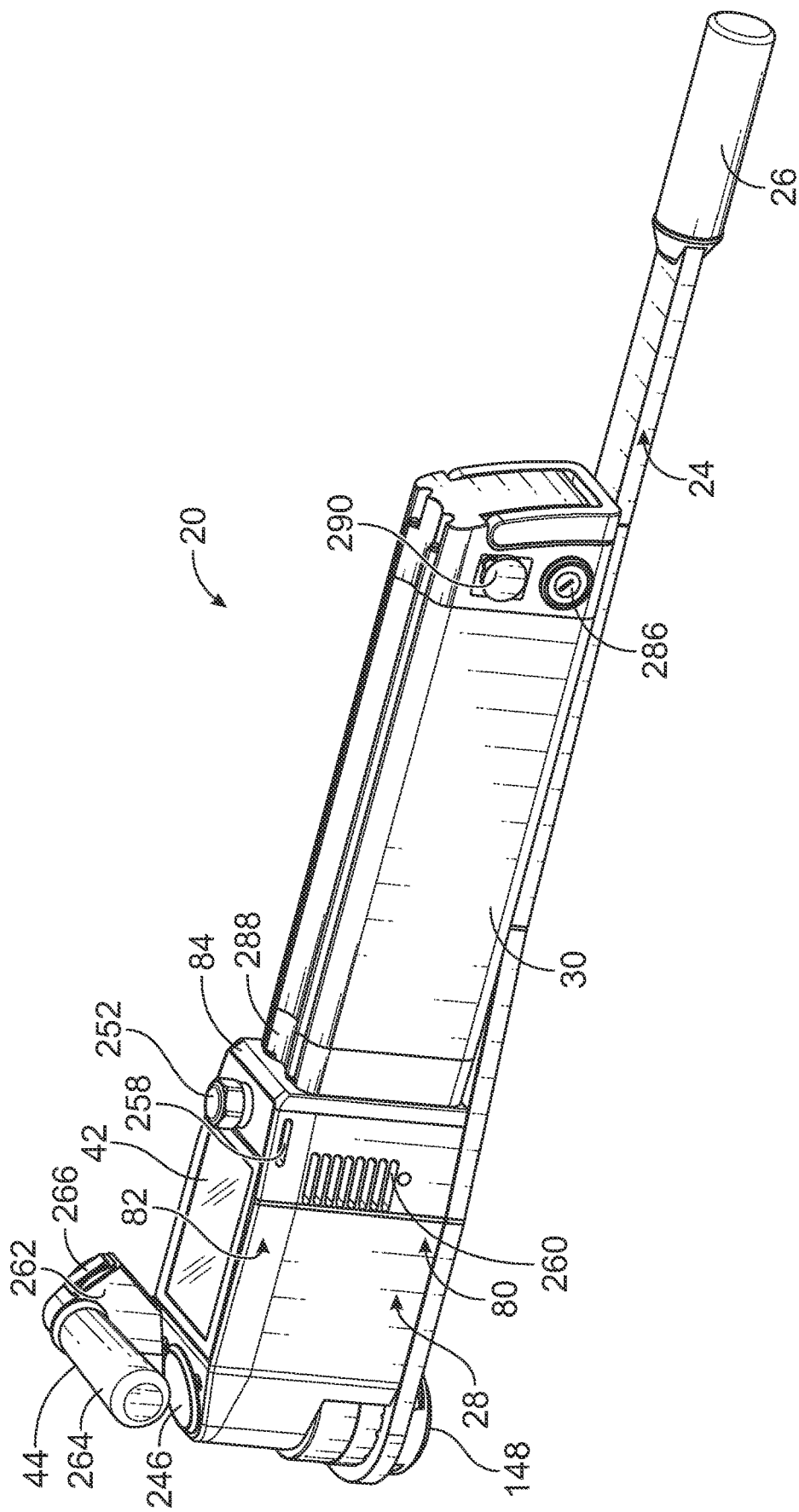
FIG. 1 is a perspective view of a valve operating machine in accordance with the present disclosure.
Figure 3:
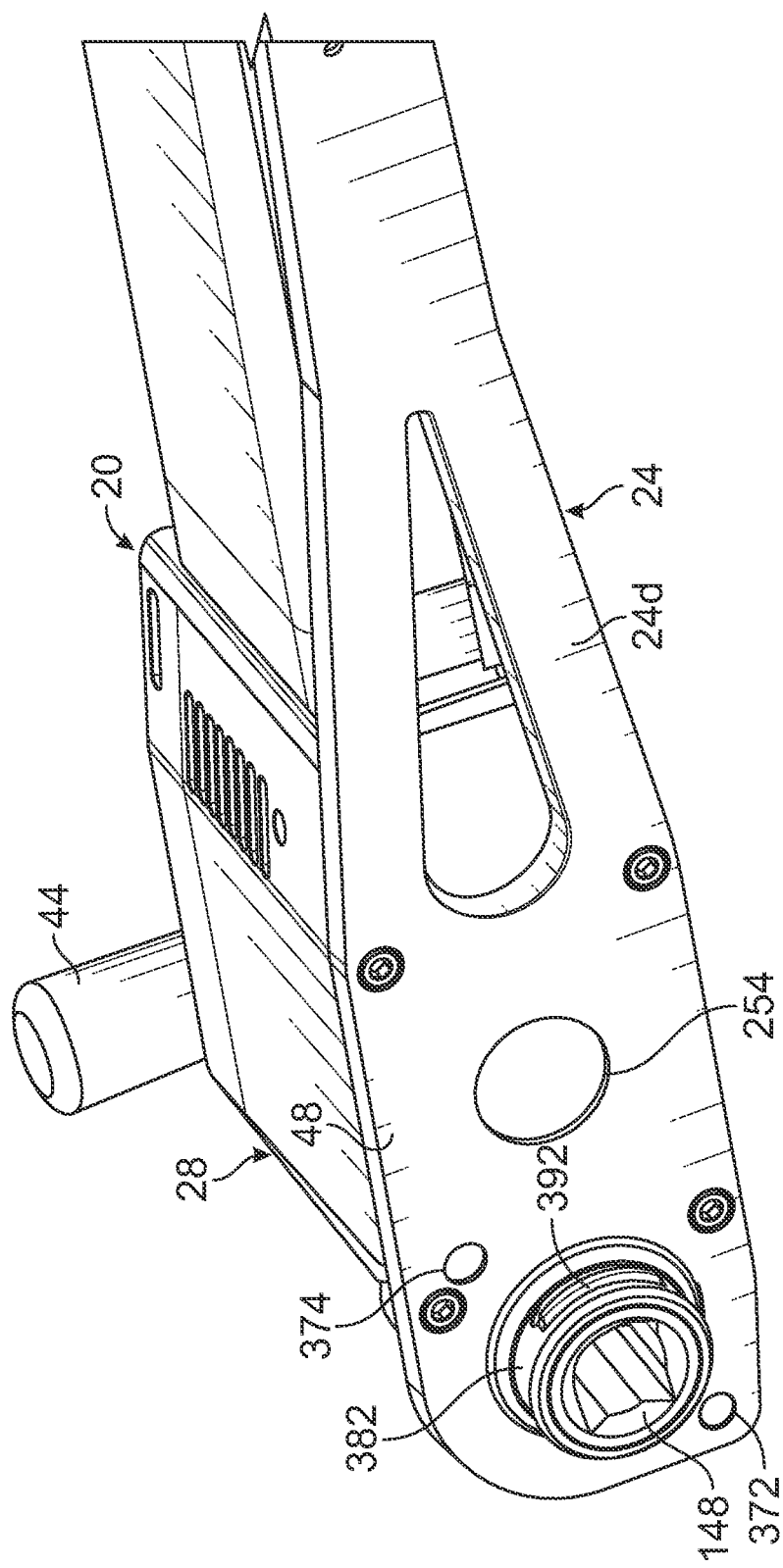
FIG. 3 is a partial bottom perspective view of the valve operating machine.
Figure 4:
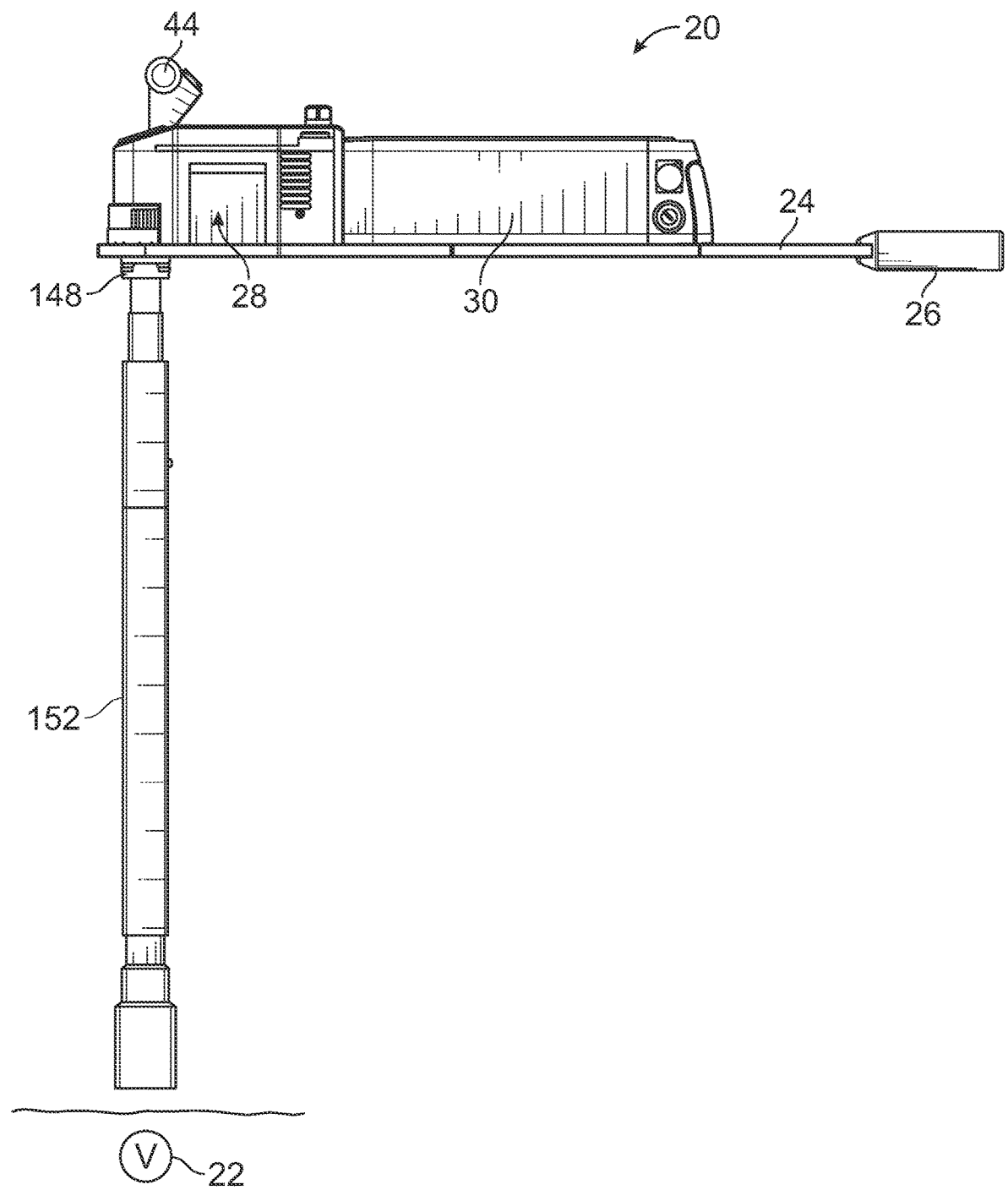
FIG. 4 is a side elevation view of the valve operating machine having a key attached thereto, with an underground valve shown in schematic form.

Referring to FIGS. 1, 3 and 4, an example of a portable valve operating machine 20 is shown which is used to exercise a valve 22, which in some examples may be an underground valve. The portable valve operating machine 20 can be easily carried by an operator to a job site.

Figure 6:
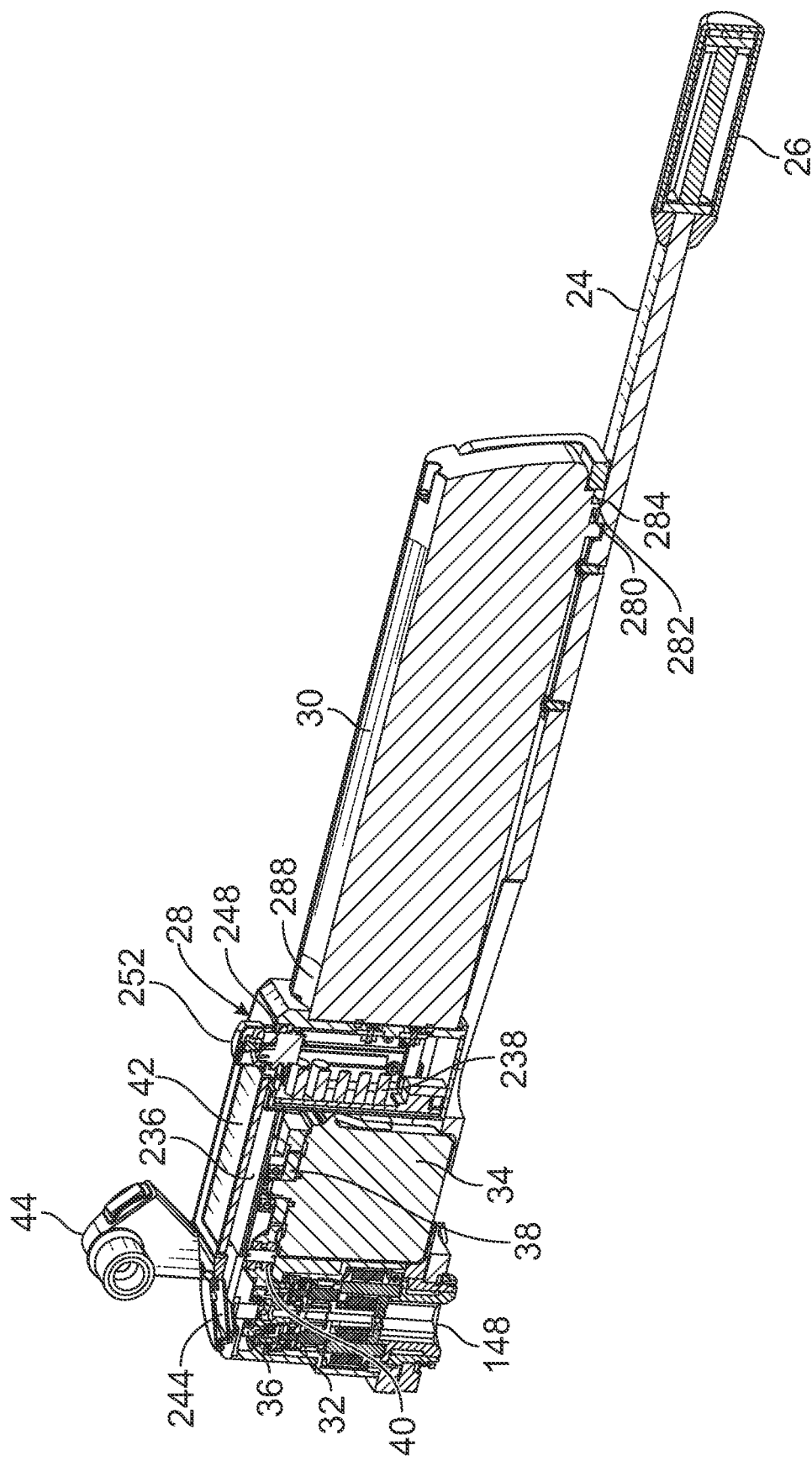
FIG. 6 is a cross-sectional view of the valve operating machine shown in perspective.
Figure 7:
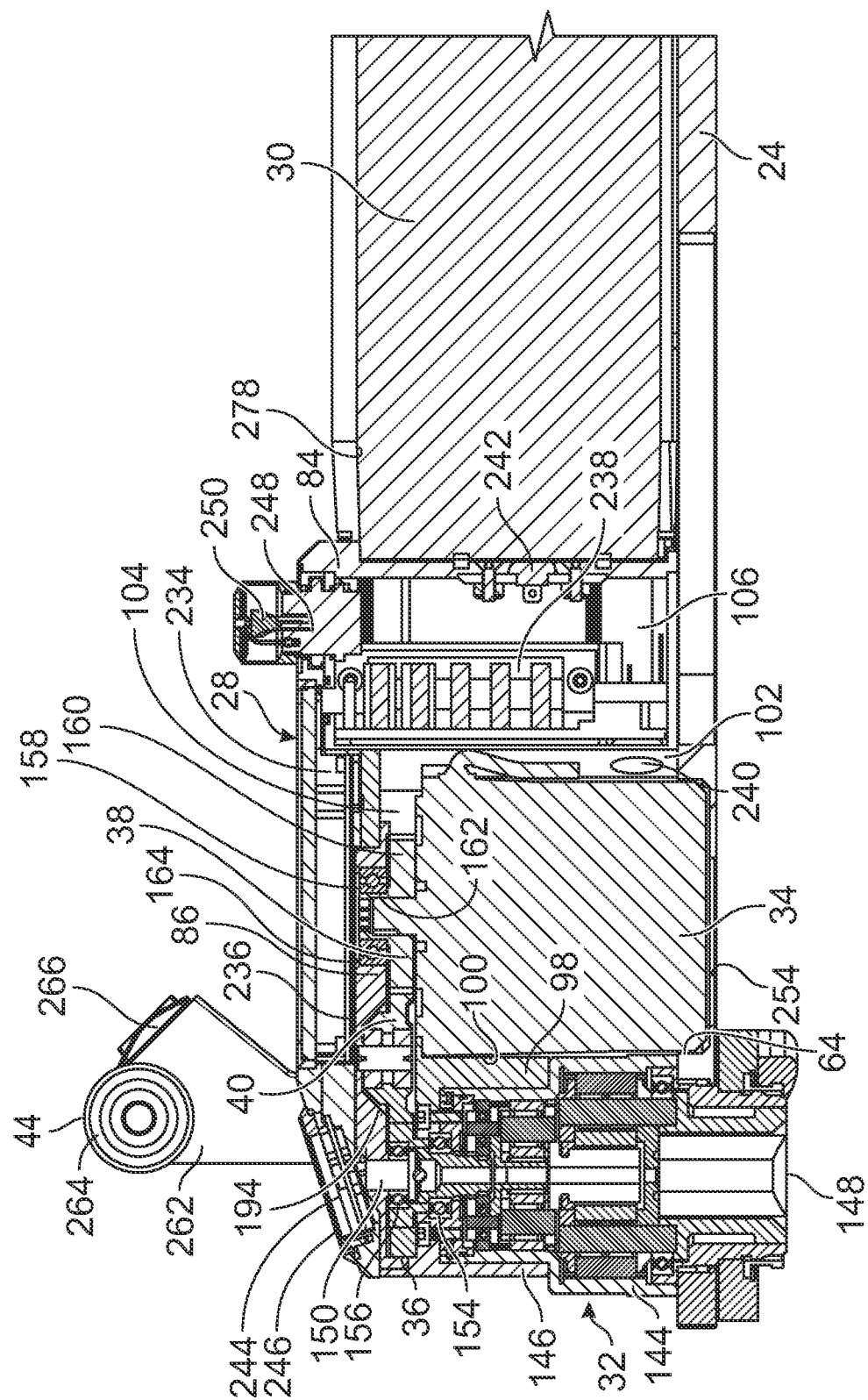
FIG. 7 is a partial cross-sectional view of the valve operating machine.

The valve operating machine 20 includes a base 24 and a first handle 26, a housing 28, and a battery 30 on the base 24. As shown in FIGS. 6 and 7, a planetary gearbox 32, a motor 34, and a plurality of gears 36, 38, 40 which are configured to be engaged with the motor 34 and the planetary gearbox 32 are within the housing 28. A display 42 is mounted to the housing 28 and a second handle 44 is attached to the housing 28. In use, the operator grasps the handles 26, 44 to steady the valve operating machine 20. Information regarding the exercising of the valve 22 is shown on the display 42. The valve operating machine 20 is used in a relatively high-power valve turning operation. The valve operating machine 20 provides a small form factor as a result of the packaging of the operating components.

Figure 8:
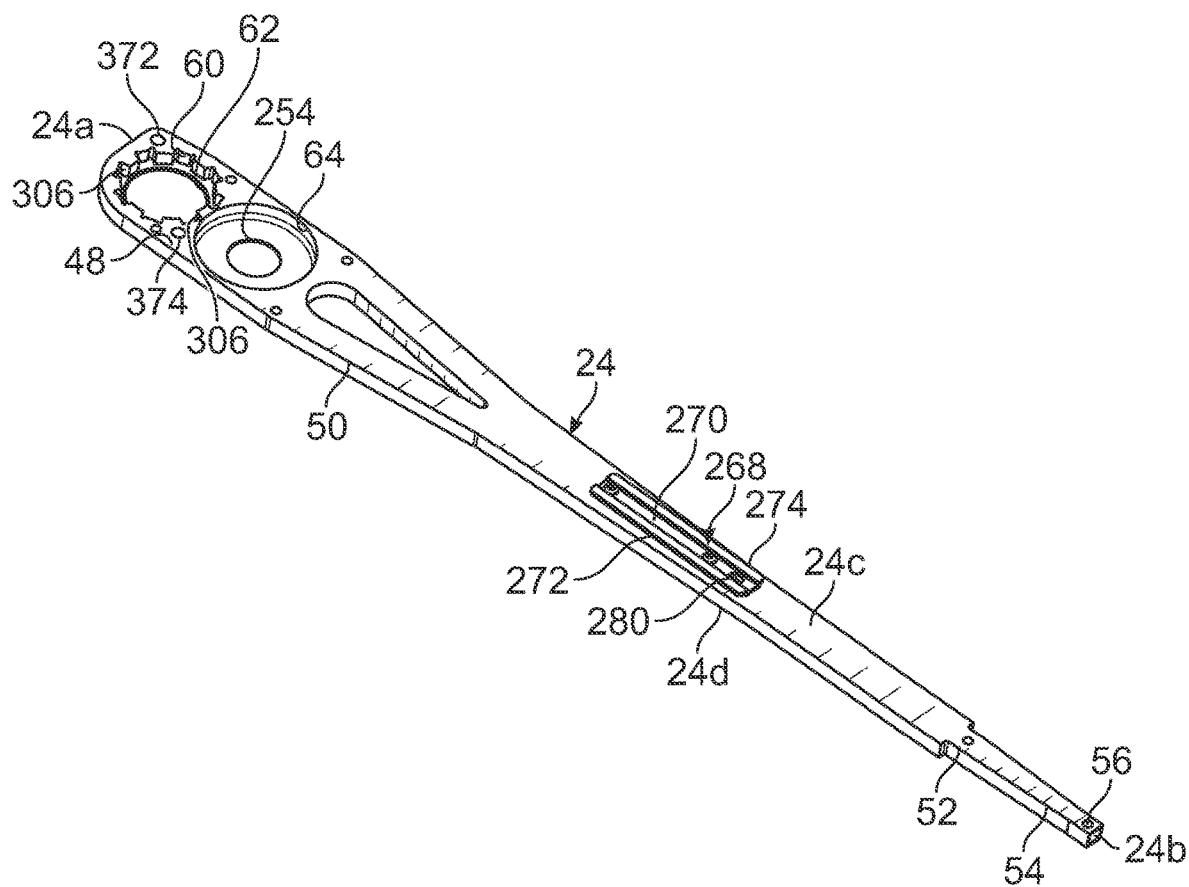
FIG. 8 is a perspective view of a base of the valve operating machine.
Figure 9:
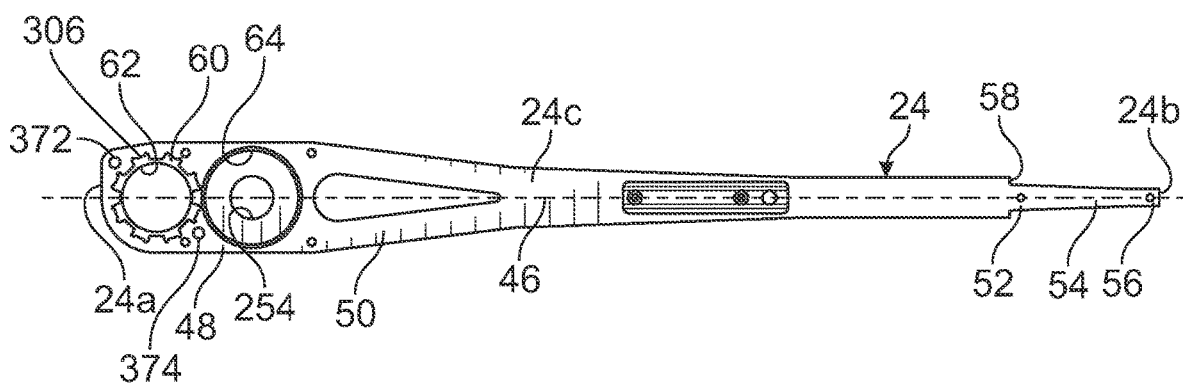
FIG. 9 is a top plan view of the base of FIG. 8.

As best shown in FIGS. 8 and 9, the base 24 is a rigid and elongated plate having front and rear opposite ends 24a, 24b, a planar upper surface 24c, and a planar lower surface 24d. A central axis 46 extends from the front end 24a to the rear end 24b. The base 24 includes a first section 48 which extends from the front end 24a rearwardly, a second intermediate section 50 which extends from a rear end of the first section 48 rearwardly, a third intermediate section 52 which has a rectangular cross-section which extends from a rear end of the second section 50 rearwardly, a fourth tapered section 54 which extends from a rear end of the third section 52 rearwardly, and a fifth section 56 which has a rectangular cross-section which extends from a rear end of the fourth section 54 rearwardly to the rear end 24b. The first section 48 is generally rectangular when viewed looking at the upper surface 24c thereof. The second section 50 reduces in width between the first section 48 and the third section 52. The second and third sections 50, 52 are separated from each other by a shoulder 58 such that the rear end of the second section 50 is wider than the front end of the third section 52 when viewed from above the upper surface 24c. The third section 52 is wider than the fifth section 56 when viewed from above the upper surface 24c.

A front pocket 60 extends downward from the upper surface 24c through the first section 48 proximate to the front end 24a of the base 24. A cylindrical central passageway 62 is provided within the pocket 60 and extends to the lower surface 24d, and has a diameter which is less than the front pocket 60. A center of the passageway 62 aligns with the central axis 46 of the base 24. A rear pocket 64 extends downward from the upper surface 24c through the first section 48 rearwardly of the front pocket 60 and proximate to the rear end of the first section 48.

Figure 10:
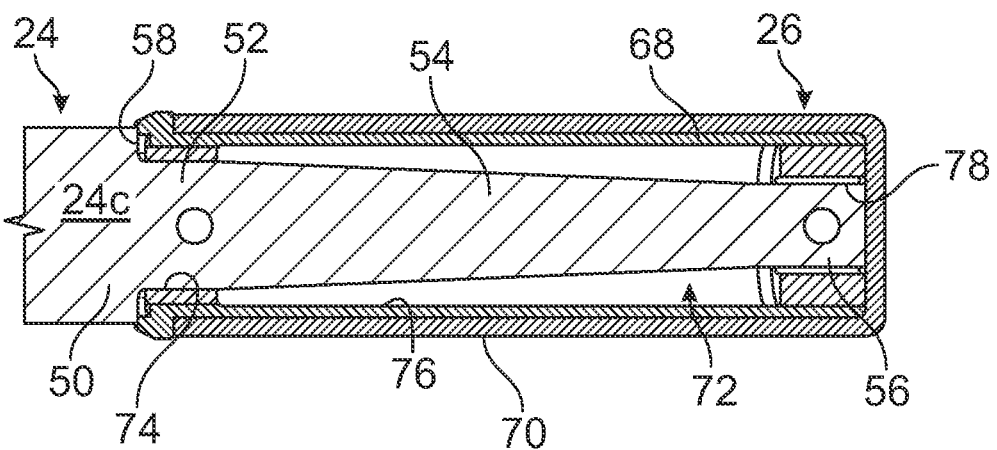
FIG. 10 is a partial cross-sectional view of the valve operating machine.
Figure 11:
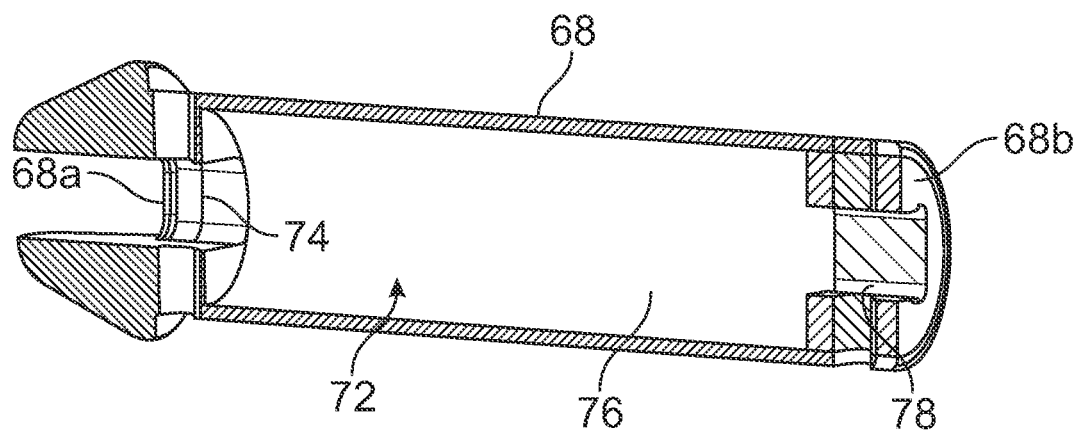
FIG. 11 is a cross-sectional view of a portion of a handle of the valve operating machine shown in perspective.

The handle 26 covers the rear end 24b of the base 24. As best shown in FIGS. 10 and 11, the handle 26 includes a base portion 68 which is attached to the third and fifth sections 52, 56 and engages against the shoulder 58 and a grip portion 70 which covers an exterior surface of the base portion 68. The base portion 68 has an exterior cylindrical surface and has a central passageway 72 extending from a front end 68a thereto to a rear end 68b thereof. A first section 74 of the passageway 72 has a rectangular cross-section and extends rearwardly from the front end 68a, a second section 76 of the passageway 72 is cylindrical and extends rearwardly from a rear end of the first section 74, and a third section 78 of the passageway 72 has a rectangular cross-section and extends rearwardly from the rear end of the second section 76. The third section 52 of the base 24 seats within the first section 74 of the passageway 72 and mirrors the shape thereof. The fifth section 56 of the base 24 seats within the third section 78 of the passageway 72 and mirrors the shape thereof. Since the base 24 and the base portions 68 have sections 52, 74 and 56, 78 which mirror each other in shape, the base portion 68 cannot rotate relative to the base 24. Fasteners are provided through aligned bores in the base 24 and in the base portion 68 to secure the base portion 68 onto the rear end of the base 24. The grip portion 70 covers the exterior surface of the base portion 68 to provide a cushioning material for the operator to grip.

Figure 2:
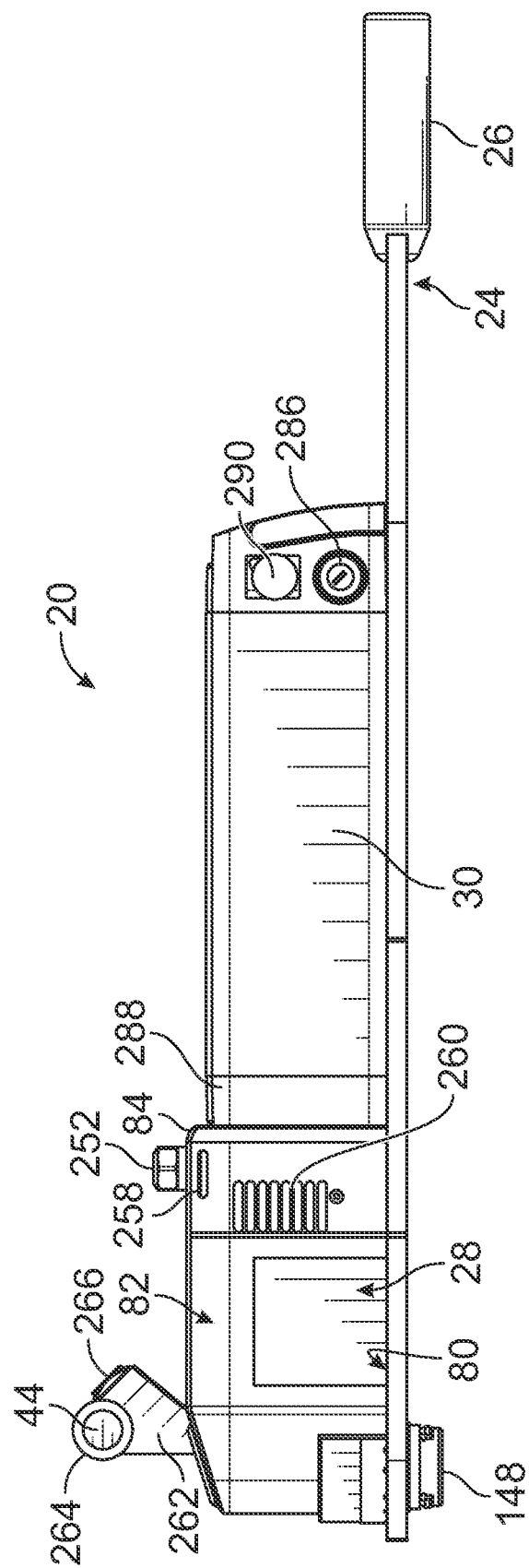
FIG. 2 is a side elevation view of the valve operating machine.

The housing 28, see FIGS. 1, 2 and 7, includes a lower housing portion 80 which is mounted on the base 24, an upper housing portion 82 mounted on the lower housing portion 80, a rear wall 84 which closes rear ends of the lower and upper housing portions 80, 82, and a gear cover 86 mounted on the lower housing portion 80 and between the lower housing portion 80 and the upper housing portion 82. The lower and upper housing portions 80, 82 are preferably form of metal so as to be robust. The rear wall 84 is non-metallic. The gear cover 86 may be formed of metal.

Figure 12:
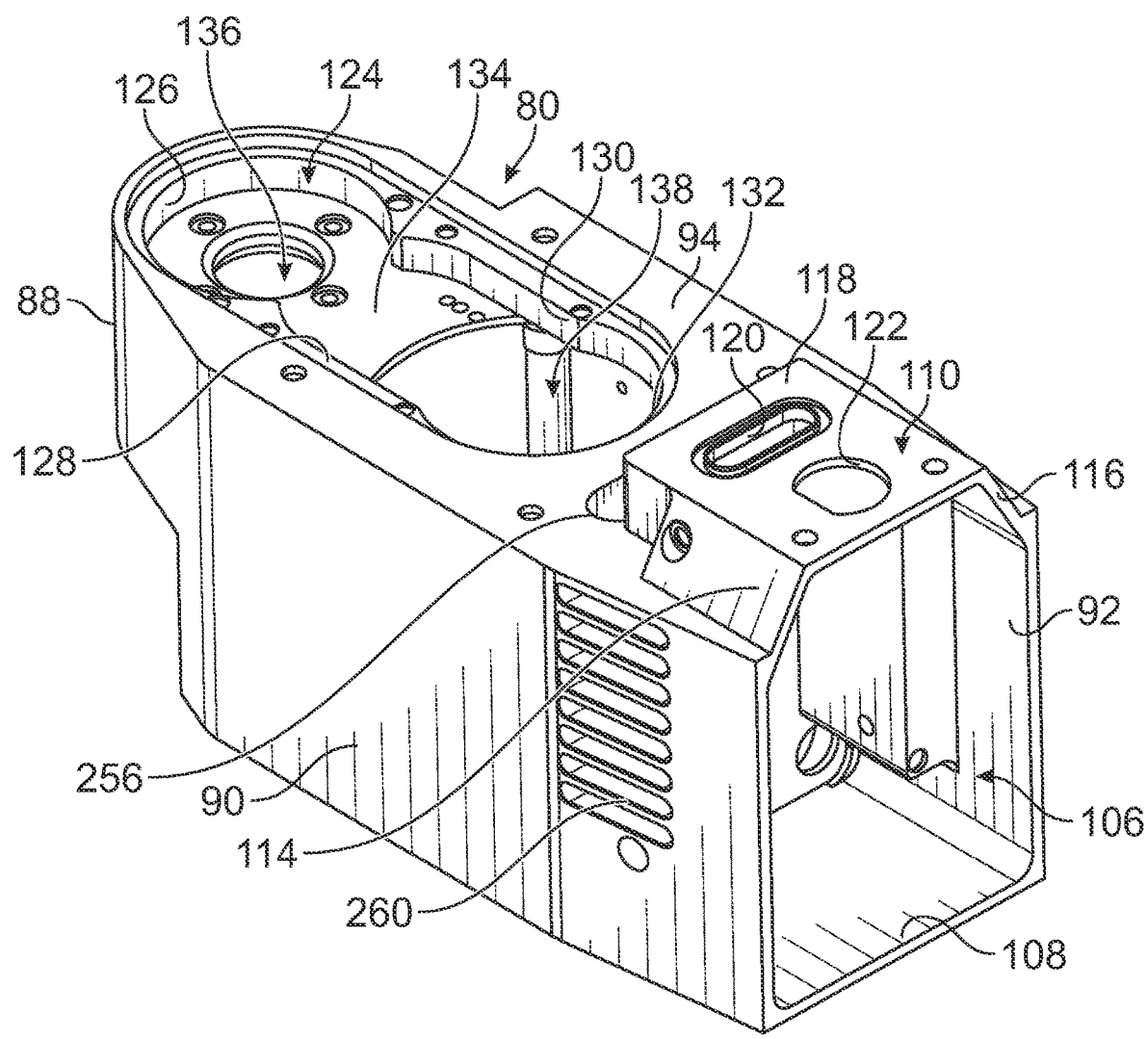
FIG. 12 is a perspective view of a lower housing portion of the valve operating machine.
Figure 13:
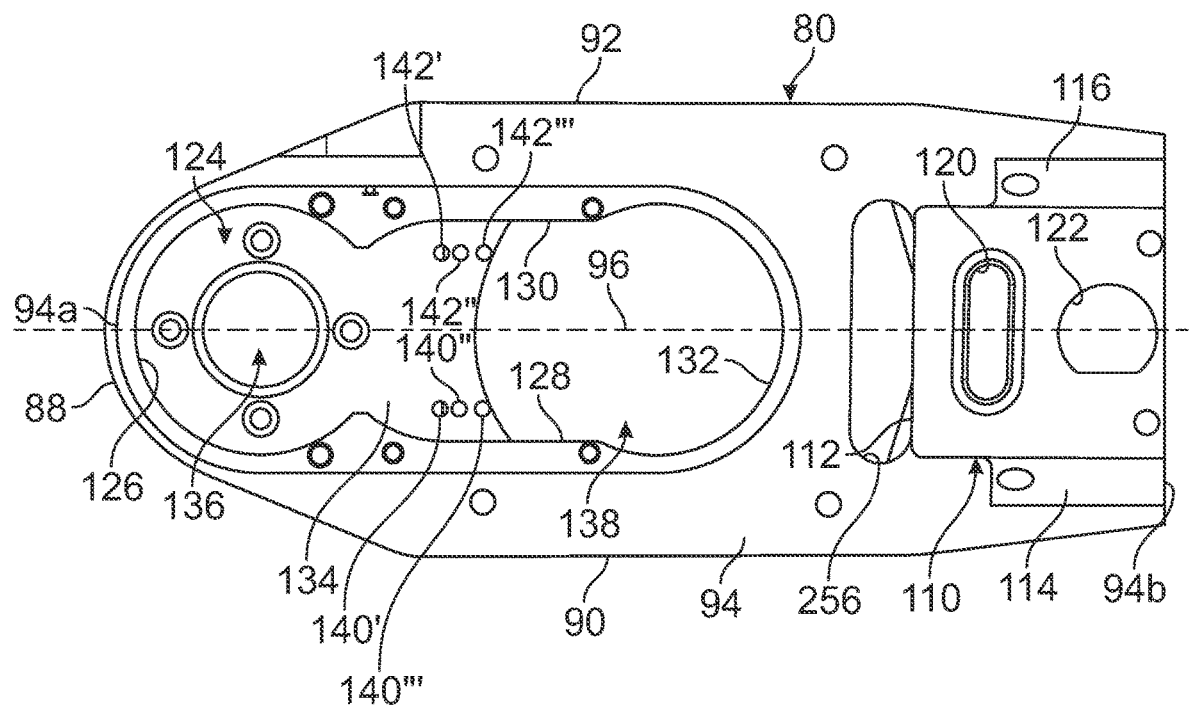
FIG. 13 is a top plan view of the lower housing portion shown in FIG. 12.
Figure 14:
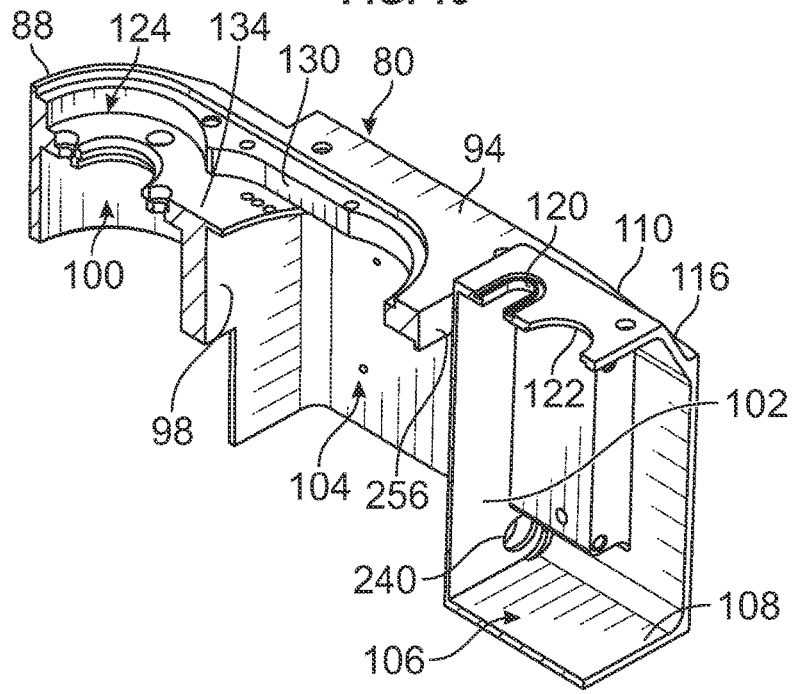
FIG. 14 is a cross-sectional view of the lower housing portion shown in FIG. 12 shown in perspective.

As best shown in FIGS. 12-14, the lower housing portion 80 includes a front wall 88, opposite side walls 90, 92 extending rearwardly from the front wall 88, and a top wall 94 which extends between the front and side walls 88, 90, 92. The top wall 94 has a front end 94a at the front wall 88 and an opposite rear end 94b. A central axis 96 is defined between the front and rear ends 94a, 94b. A first interior wall 98 extends downward from the top wall 94 and forms a front cavity 100 forwardly thereof. A second interior wall 102 extends downward from the top wall 94 and forms an intermediate cavity 104 forwardly of the second interior wall 102 and rearwardly of the first interior wall 98, and further forms a rear cavity 106 rearwardly thereof. The rear cavity 106 is closed by the rear wall 84 and a bottom wall 108. The forward and intermediate cavities 100, 104 have open lower ends.

A rear section 110 of the top wall 94 is raised to provide an increased height in the rear cavity 106. The raised rear section 110 includes a front wall 112 which extends upward from the top wall 94, opposite side walls 114, 116 extending rearwardly from the front wall 112 to the rear wall 84, and a top wall 118 which extends between the front and side walls 112, 114, 116 to the rear wall 84.

A first rear opening 120 is provided through the top wall 118 of the raised rear section 110 proximate to the front wall 112 and is communication with the rear cavity 106. A second rear opening 122 which is spaced rearwardly of the first rear opening 120 is provided through the top wall 118 and is communication with the rear cavity 106.

A gear receiving pocket 124 is formed in the top wall 94 proximate to the front end 94a and forward of the raised rear section 110. The gear receiving pocket 124 includes a front wall 126 which extends downward from the top wall 94, opposite side walls 128, 130 which extend downward from the top wall 94 and rearward from the front wall 126, a rear wall 132 which extends downward from the top wall 94 at the opposite ends of the side walls 128, 130, and a bottom wall 134 at the lower ends of the walls 126, 128, 130, 132. Each wall 126, 128, 130, 132 has a first wall portion that extends vertically downwardly from the top wall 984, a second wall portion that is perpendicular to the first wall portion and a third wall portion that extends vertically downwardly from the second wall portion. The first and second wall portions form a seat for the gear cover 86 to seat within. A front opening 136 is provided through the bottom wall 134 proximate to the front wall 126 and is in fluid communication with the front cavity 100. A rear opening 138 is provided through the bottom wall 94 proximate to the rear wall 132 and is in fluid communication with the intermediate cavity 104. Centers of the openings 136, 138 align with the central axis 96 of the lower housing portion 80.

A first set of spaced apart bores 140', 140", 140''' are formed in the bottom wall 134 forward of the rear opening 138. The bores 140', 140", 140''' are parallel to, but offset from the central axis 96, and are proximate to, but spaced from, the side wall 128. In an embodiment, the bores 140', 140", 140''' define a front bore 140', a middle bore 140" and a rear bore 140''' which are longitudinally aligned with each other. The rear bore 140''' is proximate to, but spaced forwardly of the rear opening 138. A second set of spaced apart bores 142', 142", 142''' are formed in the bottom wall 134 forward of the rear opening 138. The bores 142', 142", 142''' are parallel to, but offset from the central axis 96, and are proximate to, but spaced from, the side wall 130. In an embodiment, the bores 142', 142", 142''' define a front bore 142', a middle bore 142" and a rear bore 142''' which are longitudinally aligned with each other. The rear bore 142''' is proximate to, but spaced forwardly of the rear opening 138. The front bores 140', 142' longitudinally align with each other along the length of the top wall 94; the intermediate bores 140", 142" longitudinally align with each other along the length of the top wall 94; and the rear bores 140''', 142''' longitudinally align with each other along the length of the top wall.

The lower housing portion 80 is seated on the base 24, and the central axes 46, 96 align with each other.

The planetary gearbox 32, see FIG. 7, seats within the front cavity 100 of the lower housing portion 80 and partially seats within the front pocket 60 in the base 24. The planetary gearbox 32 includes a three-stage planetary gear system 144 housed within a thin walled planetary gearbox housing 146. In an embodiment, the three-stage planetary gear system 144 includes a plurality of helical spur gears which reduces the overall height of the planetary gearbox 32. An output socket 148 which is connected to an output of and driven by the planetary gearbox 32 extends through the passageway 62 in the base 24. The output socket 148 forms a blind bore. The planetary gearbox housing 146 is fixed to the base 24. A planetary gear spindle 150 extends upwardly from a top surface of the planetary gearbox housing 146 and through the front opening 136 in the gear receiving pocket 124.

Figure 5:
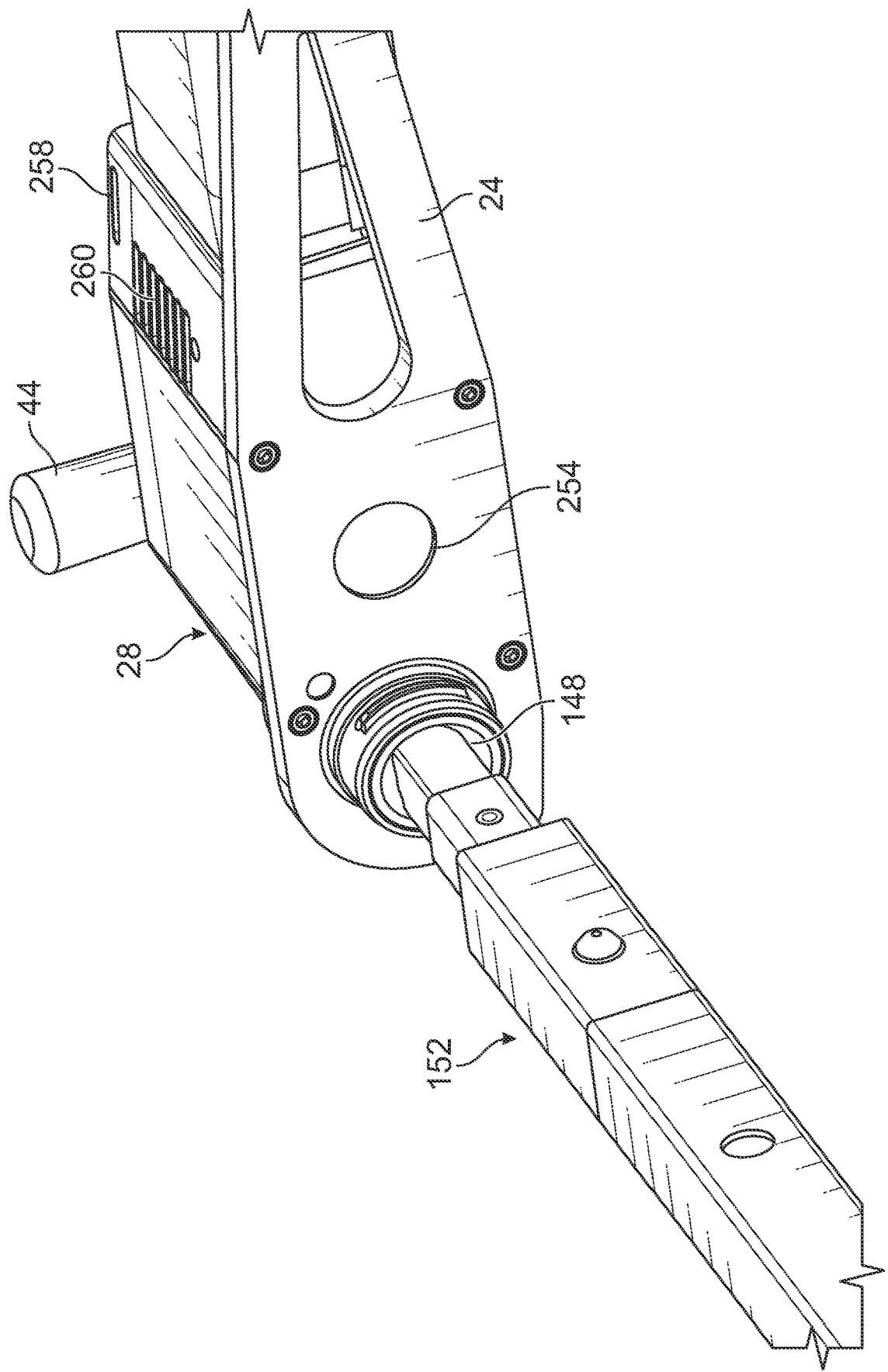
FIG. 5 is a partial bottom perspective view of the valve operating machine with the key of FIG. 4 attached thereto.

A key 152, see FIGS. 4 and 5, is configured to be attached to the output socket 148 during exercising of the valve 22. The key 152 can be detached from the output socket 148 so that another key can be mounted in the output socket 148.

Figure 15:
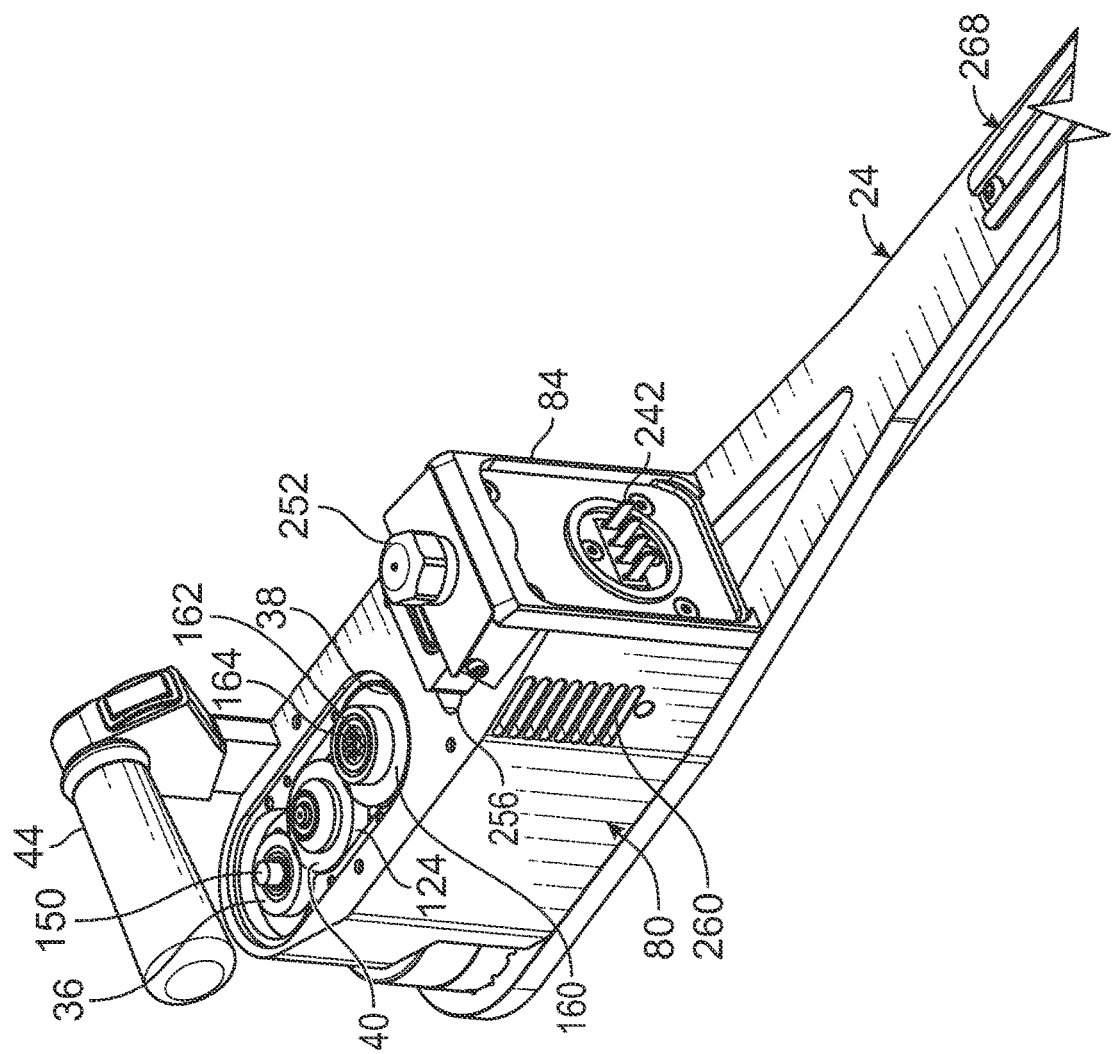
FIG. 15 is a partial perspective view of the valve operating machine with some components removed to show inner components of the valve operating machine.
Figure 16:
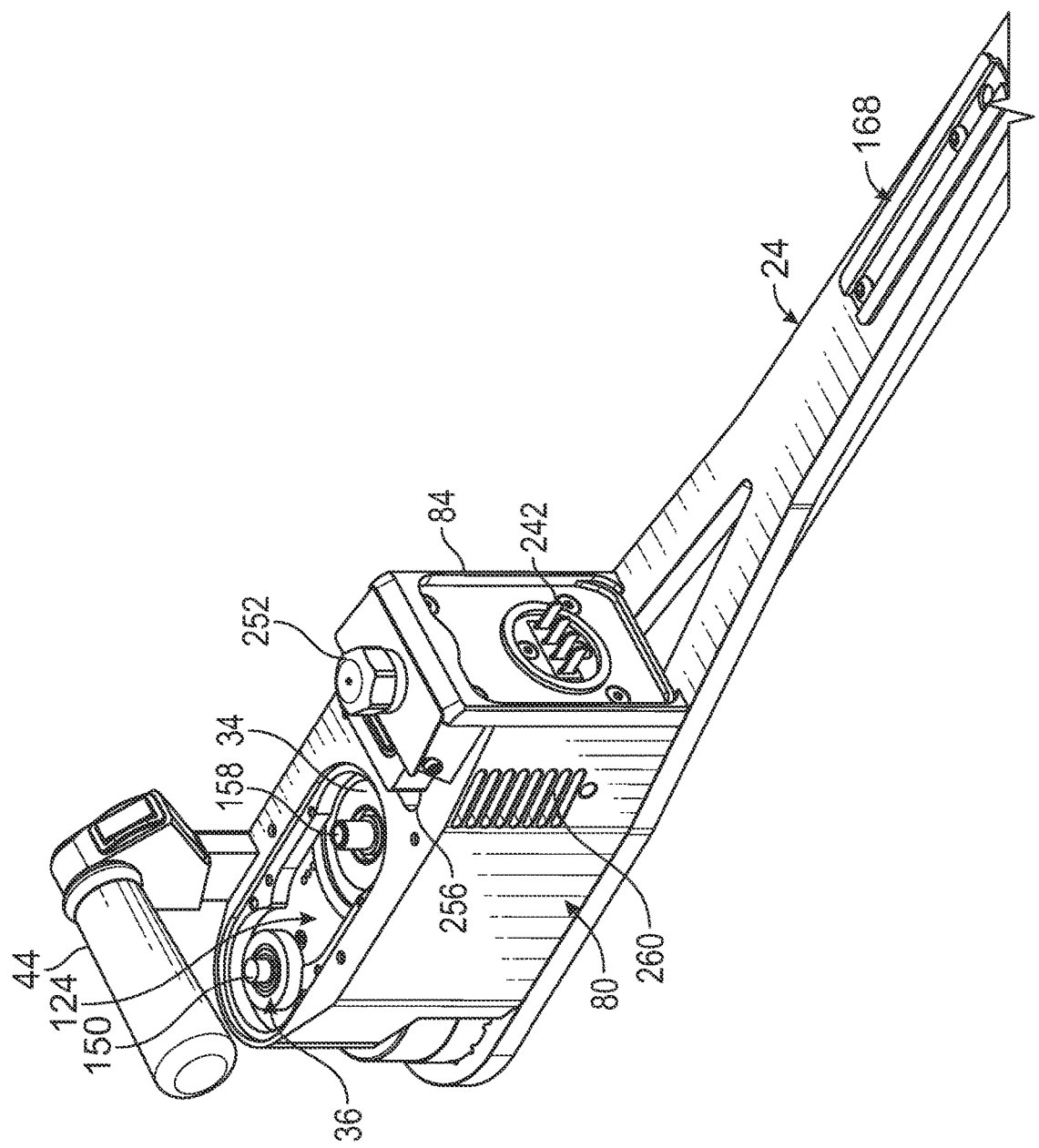
FIG. 16 is a partial perspective view of the valve operating machine with additional components removed from that which are shown in FIG. 15 to show further inner components of the valve operating machine.

The gear 36, see FIGS. 7 and 15, is a planetary input gear which is removably mounted to the planetary gear spindle 150, and seats within the gear receiving pocket 124. The planetary input gear 36 has a toothed profile on its outer perimeter. The planetary gear spindle 150 and the planetary input gear 36 are connected to each other such that the planetary input spindle 150 rotates with the planetary input gear 36. The planetary input spindle 150 is connected to the planetary gear housing 146 by a lower bearing 154 to allow the planetary input spindle 150 and the planetary input gear 36 to rotate relative to the planetary gear housing 146. An upper bearing 156 is seated on the planetary input spindle 150 and is spaced from the lower bearing 154.

As shown in FIG. 7, the motor 34 seats within the intermediate cavity 104 of the lower housing portion 80 and partially seats within the rear pocket 64 in the base 24. In some embodiments, the rear pocket 64 is removed and the motor 34 is sized to fit between the planar upper surface 24c of the base 24 and the lower surface of the top wall 94 of the lower housing portion 80. The motor 34 has a motor shaft 158 which extends upwardly from a top surface of the motor 34 and through the rear opening 138 in the gear receiving pocket 124. The motor 34 may be a DC motor.

The gear 38, see FIGS. 7 and 15, is a motor gear is mounted on the motor shaft 158 and seats within the gear receiving pocket 124. The motor gear 38 has a lower portion 160 having a toothed profile on its outer perimeter and an upper portion 162 that extends upwardly therefrom. A bearing 164 is mounted on the upper portion 162 and seats on an upper surface of the lower portion 160. The motor shaft 158 and the motor gear 38 are connected such that the motor gear 38 rotates with the motor shaft 158.

Figure 17:
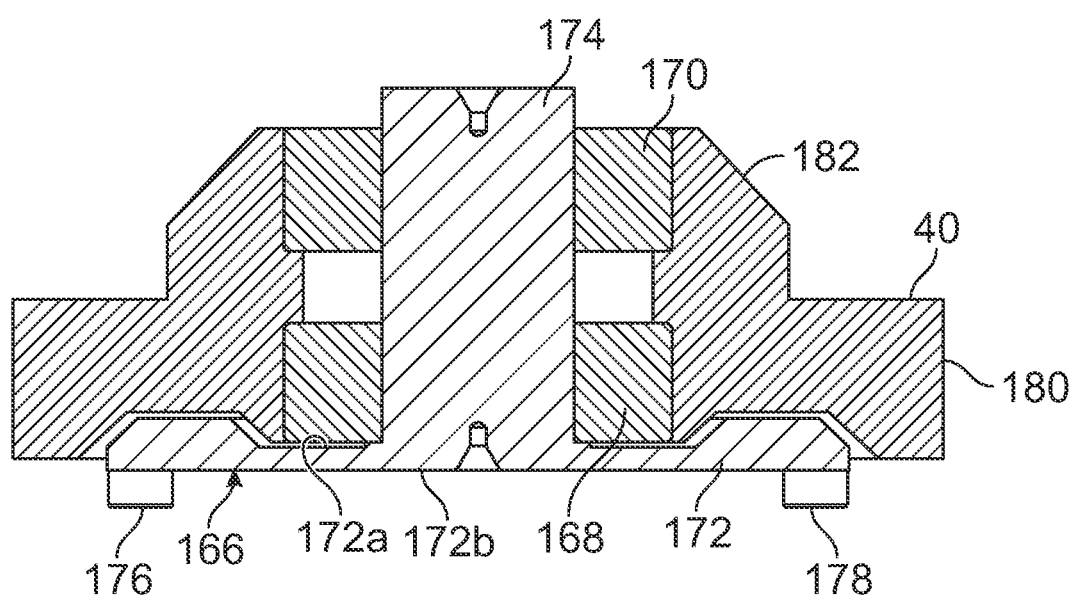
FIG. 17 is a cross-sectional view of an idler gear assembly of the valve operating machine.

The gear 40, see FIGS. 7, 15 and 17, is an idler gear which forms part of an idler gear assembly mounted in the gear receiving pocket 124 between the planetary input gear 36 and the motor gear 38. The idler gear assembly further includes an idler shaft 166 and a pair of bearings 168, 170. As best shown in FIG. 17, the idler shaft 166 has a base 172 having a shaft 174 extending upwardly from an upper surface 172a thereof at the center thereof, and a pair of spaced apart pins 176, 178 extending downwardly from a lower surface 172b thereof and at diametrically opposed positions which are radially outward of the shaft 174. The idler gear 40 is mounted on the shaft 174 by the bearings 168, 170 so that the idler gear 40 rotates relative to the shaft 166. The idler gear 40 has a lower portion 180 which surrounds the bearing 168 and has a toothed profile on its perimeter, and an upper portion 182 which extends upwardly from the lower portion 180 and surrounds the bearing 170. A portion of the shaft 174 extends upwardly from the bearing 170. The idler gear assembly is attached to the bottom 134 of the gear receiving pocket 124 by the pins 176, 178 seating with one of the aligned pairs of bores, for example bores 140', 142'. The idler gear assembly can be attached within the gear receiving pocket 124 by the pins 176, 178 seating with the front bores 140', 142', by the pins 176, 178 seating with the intermediate bores 140", 142", or by the pins 176, 178 seating with the rear bores 140'", 142'". The shaft 174 aligns longitudinally with the aligned central axes 46, 96 of the base 24 and the housing 28.

The toothed profile on the planetary input gear 36 meshes with the toothed profile of the idler gear 40, and the toothed profile of the idler gear 40 meshes with the toothed profile of the motor gear 38. Thus, when the motor 34 is actuated, the motor gear 38 is driven, thereby causing the idler gear 40 and the planetary input gear 36 to rotate. When the planetary input gear 36 rotates, the three-stage planetary gear system 144 within the planetary gearbox 32 rotate which, in turn, causes the output socket 148 to rotate, and further in turn causes the key 152 to rotate. This provides a high efficiency gearing reduction. It has been found because of the gear combination used, that a 90% efficiency can be obtained.

Which pair of bores 140', 142' or 140", 142" or 140'", 142'" the idler gear assembly is seated dictates the relative sizes of the planetary input gear 36 and the motor gear 38, thereby allowing the gear ratio to be changed by the manufacturer.

Figure 18:
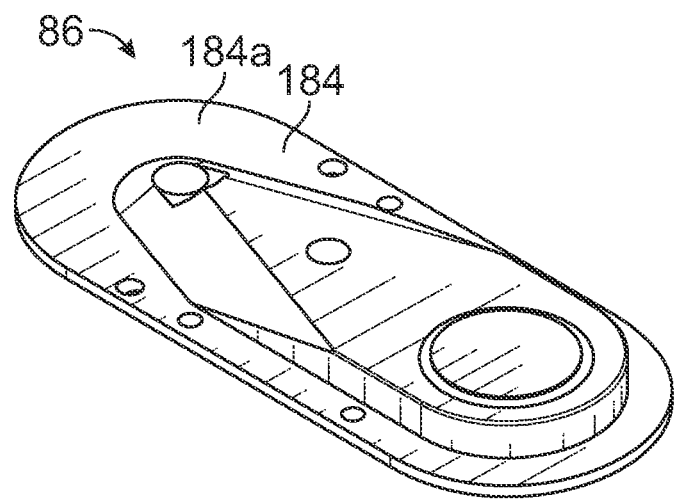
FIGS. 18 and 19 are perspective views of a gear cover of the valve operating machine.
Figure 19:
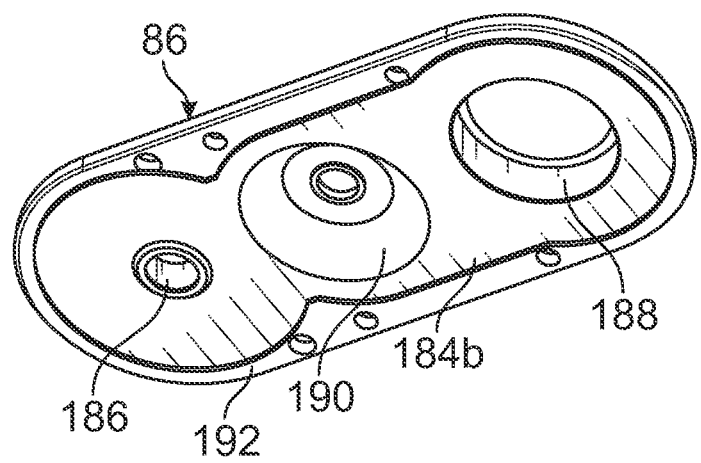
Figure 20:
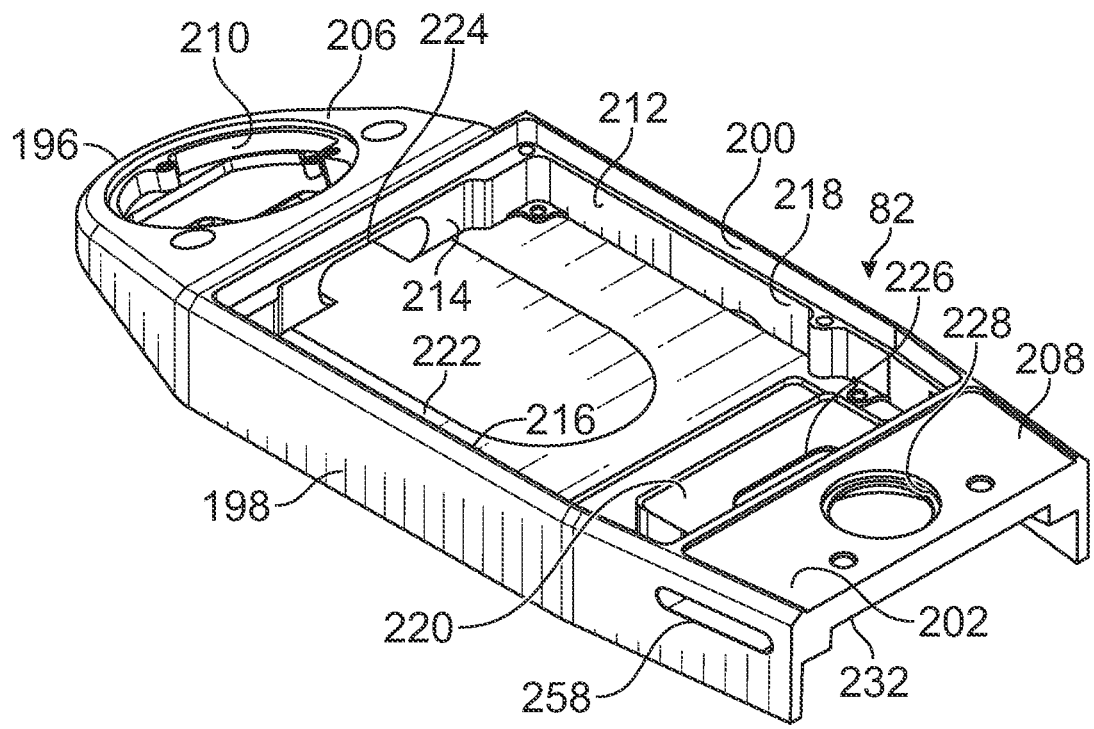
FIGS. 20 and 21 are perspective views of an upper housing portion of the valve operating machine.
Figure 21:
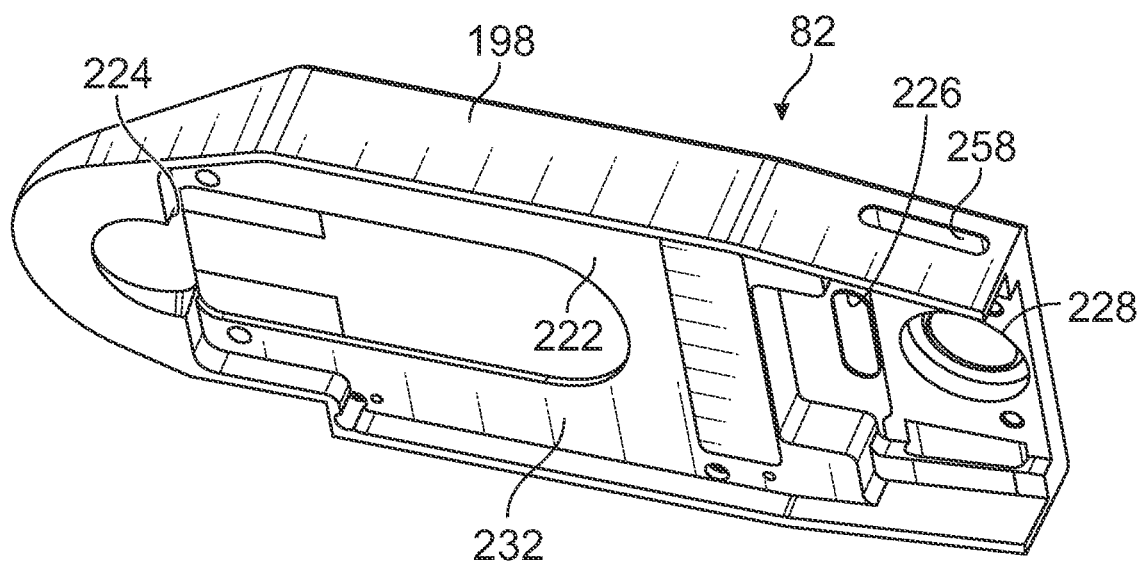
Figure 22:
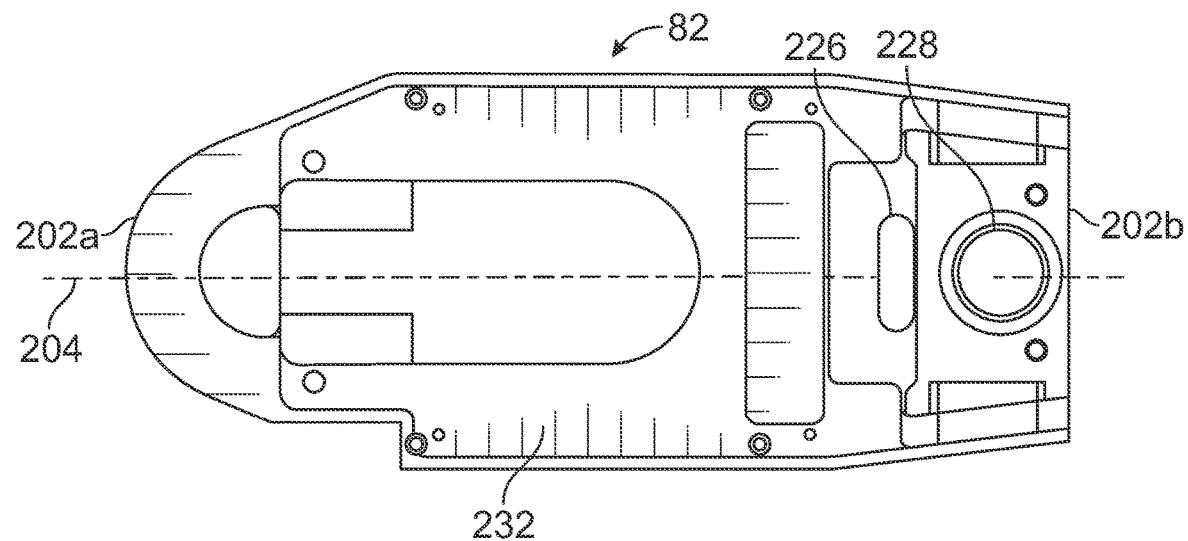
FIG. 22 is a top plan view of the upper housing portion shown in FIGS. 20 and 21.
Figure 23:
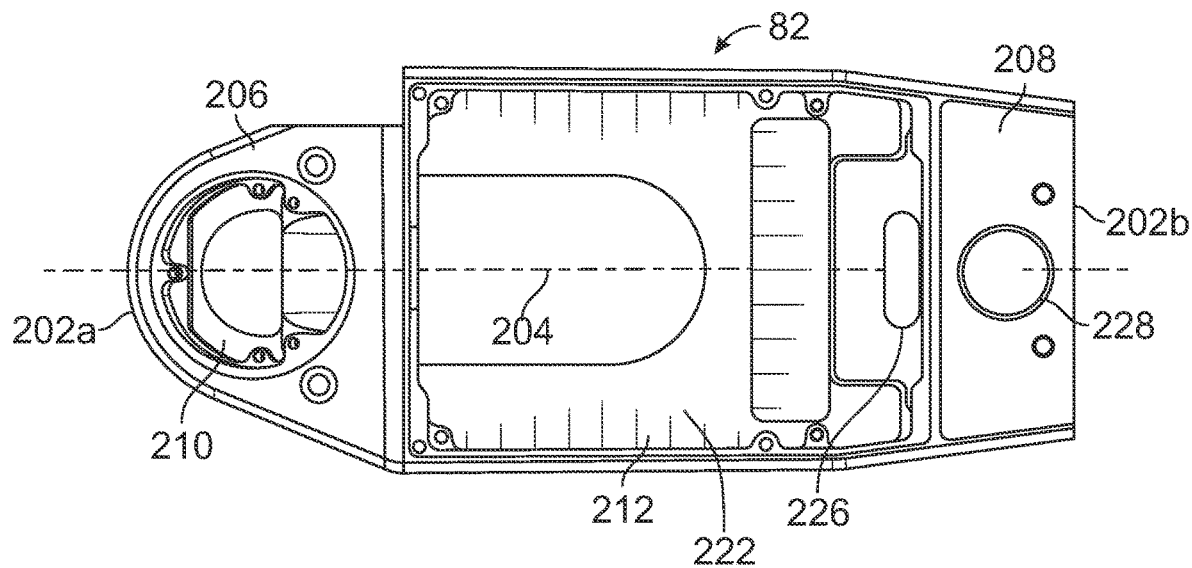
FIG. 23 is a bottom plan view of the upper housing portion shown in FIGS. 20 and 21.

As best shown in FIGS. 7, 18 and 19, the gear cover 86 is formed from a wall 184 having an upper surface 184a and a planar lower surface 184b. Front, rear and intermediate recesses 186, 188, 190 extend upward from the lower surface 184b. A lip 192 extends downward from the lower surface 184b around the perimeter of the recesses 186, 188, 190 and mirrors the shape the first and second wall portions of the walls 126, 128, 130, 132 which form the seat in the gear receiving pocket 124 of the lower housing portion 80. The gear cover 86 seats on the lower housing portion 80 such that the lip 192 is within the seat and the gears 36, 38, 40 are positioned therebetween in a cavity 194 formed by the gear receiving pocket 124 and the recesses 186, 188, 190 and the lip 192.

The planetary gear spindle 150 of the planetary gear 36 seats within the front recess 186. The planetary input gear 36 and its upper bearing 156 are positioned between the lower surface 184b of the gear cover 86 and the bottom wall 134 of the gear receiving pocket 124 in the lower housing portion 80. The upper portion 162 of the motor gear 38 and its bearing 164 seat within the rear recess 188. The lower portion 160 is positioned between the lower surface 184b of the gear cover 86 and the bottom wall 134 of the gear receiving pocket 124 in the lower housing portion 80. The upper portion 182 of the idler gear 40, the bearing 170 and the portion of the shaft 174 that extends upwardly from the bearing 170 seat within the intermediate recess 190. The lower portion 180, the bearing 168 and the base 172 are positioned between the lower surface 184b of the gear cover 86 and the upper end of the motor 34. The gear cover 86 and the lower housing portion 80 and the motor 34 support the gears 36, 38, 40 for rotation within the cavity 194.

Since which pair of bores 140', 142' or 140", 142" or 140'", 142'" the idler gear assembly is seated dictates the relative sizes of the planetary input gear 36 and the motor gear 38, three separate gear covers 86 are necessary to accommodate the three different positions that the idler gear assembly is seated within to ensure that the gear 36, 38, 40 are trapped by the gear cover 86.

As best shown in FIGS. 20-23, the upper housing portion 82 includes a front wall 196, opposite side walls 198, 200 extending rearwardly from the front wall 196 to the rear wall 84, and a top wall 202 which extends between the front and side walls 196, 198, 200 and extends to the rear wall 84. The top wall 202 has a front end 202a at the front wall 88 and an opposite rear end 202b. A central axis 204 is defined between the front and rear ends 202a, 202b.

The top wall 202 has a front portion 206 which is angled relative to the central axis 204, and a rear portion 208 which extends from the front portion 206 and is planar.

A first front pocket 210 is provided in the front portion 206 and extends downward from the top wall 202. A second pocket 212 is rearward of the front portion 206 and extends downward from the top wall 202. The second pocket 212 includes a front wall 214, side walls 216, 218 extending rearwardly from the front wall 214, a rear wall 220 at the opposite ends of the side walls 216, 218, and a bottom wall 222 extending between the walls 214, 216, 218, 220. An opening 224 is provided through the front wall 214 of the second pocket 212 to allow communication between the first pocket 210 and the second pocket 212. An opening 226 is provided through the bottom wall 222 proximate to the rear wall 220. A rear opening 228 is provided through the top wall 202 proximate to the rear end 202b.

A lower recess 232 is formed by the front and side walls 196, 198, 200 which is open to the rear. The openings 226, 228 are in communication with the lower recess 232.

The upper housing portion 82 seats over the gear cover 86 and over the raised rear section 110 of the top wall 94 and is attached to the top wall 94 of the lower housing portion 80 and to the rear wall 84. The central axes 46, 96, 204 align with each other. This attachment forms an electronics receiving cavity 234, see FIG. 7, between the upper housing portion 82, the gear cover 86, the lower housing portion 80 and the rear wall 84. The opening 226 in the upper housing portion 82 aligns with the opening 120 through the lower housing portion 80 and the openings 120, 226 are in communication with the electronics receiving cavity 234. The opening 228 in the upper housing portion 82 aligns with the opening 122 through the lower housing portion 80 and the openings 122, 228 are in communication with the electronics receiving cavity 234.

The display 42, which allows the operator to interact with and control the valve operating machine 20, is mounted within the second pocket 212 and is sealed thereto by a seal. In some embodiments, the display 42 is removable from the second pocket 212. A display controller 236, such as a printed circuit board having suitable software and firmware, an on-board memory and WI-FI capabilities, for operating the display 42 is provided within the second pocket 212. Cabling connected to the display controller 236 passes from the second pocket 212 in the upper housing portion 82, between the raised rear section 110 of the lower housing portion 80 and the display 42, through the opening 226, through the electronics receiving cavity 234, through the opening 120 in the lower housing portion 80 and into the rear cavity 106.

A motor controller 238 is mounted within the rear cavity 106 and is in electrical communication with display controller 236 via the cabling. The motor controller 238 is further in electrical communication with the motor 34 via cabling which passes through an opening 240 through the interior wall 102. This cabling is sealed to the opening 240 to keep the rear cavity 106 sealed. A sealed connector 242 is mounted through the rear wall 84 and extends into the rear cavity 106 and is electrically connected to the motor controller 238.

Since separate controllers 236, 238 are provided for operating the display 42 and the motor 34, if it is desirable to change the motor 34 for a new motor, this can be done easily without needing to change the display controller 236. Likewise, since separate controllers 236, 238 are provided for operating the display 42 and the motor 34, if it is desirable to change the display 42 for a new display, this can be done easily without needing to change the motor controller 238.

A global positioning emitter 244 is mounted within the front pocket 210 of the upper housing portion 82 and is covered by a cover 246, which may be formed of plastic, which is sealed to the top wall 202 of the upper housing portion 82. The global positioning emitter 244 is connected to the display controller 236 via cabling which pass through the opening 224 between the first pocket 210 and the second pocket 212.

Figure 24:
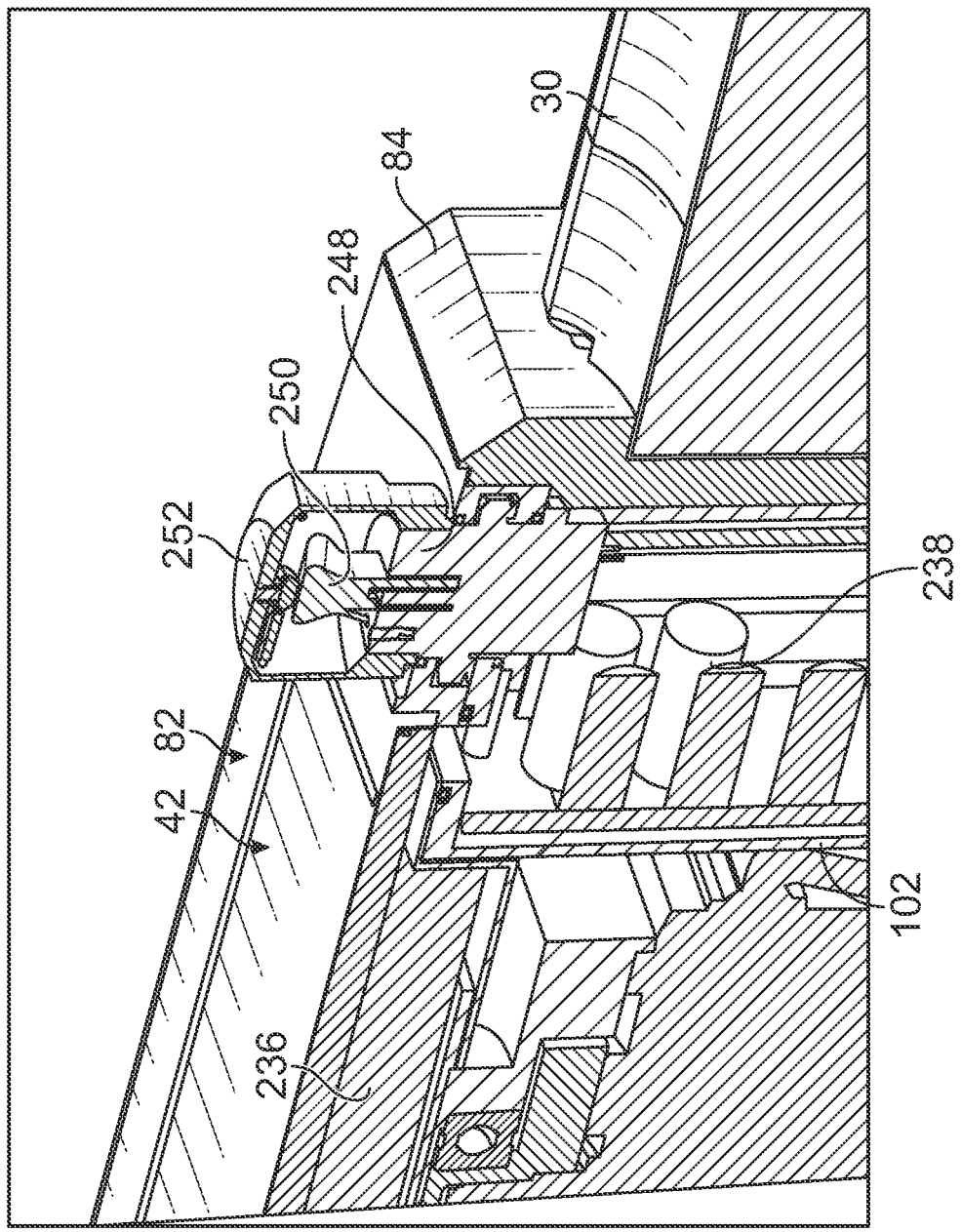
FIG. 24 is a partial cross-sectional view of the valve operating machine.

A Universal Serial Bus (USB) connector 248 is sealingly mounted within the openings 228, 122 by sealing members, such as an O-rings, and extends into the rear cavity 106 of the lower housing portion 80, see FIG. 24. The USB connector 248 is connected to the display controller 236 via cabling which passes through the rear cavity 106, the opening 120 and passes into the second pocket 212 and is electrically connected to the display controller 236. The USB connector 248 can also be electrically connected to the motor controller 238. A removable Universal Serial Bus (USB) 250 is mounted within the USB connector 248. A cover 252 is removably attached to the USB connector 248 and when connected to the USB connector 248 is sealingly engaged therewith by a sealing member, such as an O-ring. This provides a waterproof seal for the USB 250. The cover 252 may be connected to the upper housing portion 82 by a lanyard.

As a result of this arrangement, the planetary gear spindle 150, the motor shaft 158 and the idler shaft 166 are parallel to each other, but are offset longitudinally from each other along the central axes 46, 96, 204 of the base 24 and the lower and upper housings 80, 82. Each gear 36, 38, 40 sits horizontally relative to the base 24.

The planetary gearbox 32 and the motor 34 are in a horizontal layer with each other and above the base 24. The gears 36, 38, 40 are in a horizontal layer which is stacked above the planetary gearbox 32 and the motor 34. The display controller 236 is in a horizontal layer which is stacked above the gears 36, 38, 40. The display 42 is in a horizontal layer which is stacked above the display controller 236. This allows for a compact arrangement of the components, a reduced height of the overall assembly, and provides for even weight distribution.

A cooling system is provided to vent heat generated by the motor 34 and the controllers 236, 238 from the housing 28. The cooling system includes an opening 254 in the base 24, an opening 256 in the lower housing portion 80, an opening 258 in the upper housing portion 82, and fins 260 in the lower housing portion 80. The opening 254 in the base 24 is provided through the base 24 and within the rear pocket 64. The opening 254 extends to the lower surface 24*d* of the base 24. A center of the opening 254 may align with the central axis 46 of the base 24. The opening 256 in the lower housing portion 80 is through the top wall 94 forward of the raised rear section 110, and is in communication with the electronics receiving cavity 234. The opening 258 is through the side wall 198 proximate to the rear end 202*b*. The opening 258 is in fluid communication with the electronics receiving cavity 234. The fins 260 are formed in the exterior surface of the side walls 90, 92 proximate to the rear cavity 106. To cool the components, air comes in through the opening 254 in the base 24 and passes into the rear pocket 64. The air flows around the motor 34 and through the intermediate cavity 104. The air passes through the opening 256 in the top wall 94 of the lower housing portion 80 and into the electronics receiving cavity 234. The air flows through the electronics receiving cavity 234 and out of the opening 258 of the upper housing portion 82. The fins 260 also dissipate heat by conduction.

The second handle 44 is attached to the lower housing portion 80 and extends upward and over the upper housing portion 82. The second handle 44 includes a vertical arm portion 262 which is attached to the side wall 92 proximate to the front wall 88 and which extends upward therefrom, and a horizontal arm portion 264 which extends from an upper end of the vertical arm portion 262 and over the front portion 206 of the top wall 202 of the second housing portion 82. The horizontal arm portion 264 has a grip material thereon, which may include a cushion, to provide the operator with a comfortable grip. The horizontal arm portion 264 extends over the cover 246 for the global positioning emitter 244 so as to not block the operator's view of the display 42 from above. Because of the position of the second handle 44, if the valve operating machine 20 is dropped upside-down, the second handle 44 serves to protect the display 42 from damage.

A control switch 266 for controlling the direction of rotation of the output socket 148, and thus the key 152, is provided at an upper end of the vertical arm portion 262 to allow an operator to easily operate the valve operating machine 20 with the operator's thumb. A channel (not shown) is provided through the vertical arm portion 262 to allow for cabling to connect the control switch 266 to the display controller 236.

Figure 25:
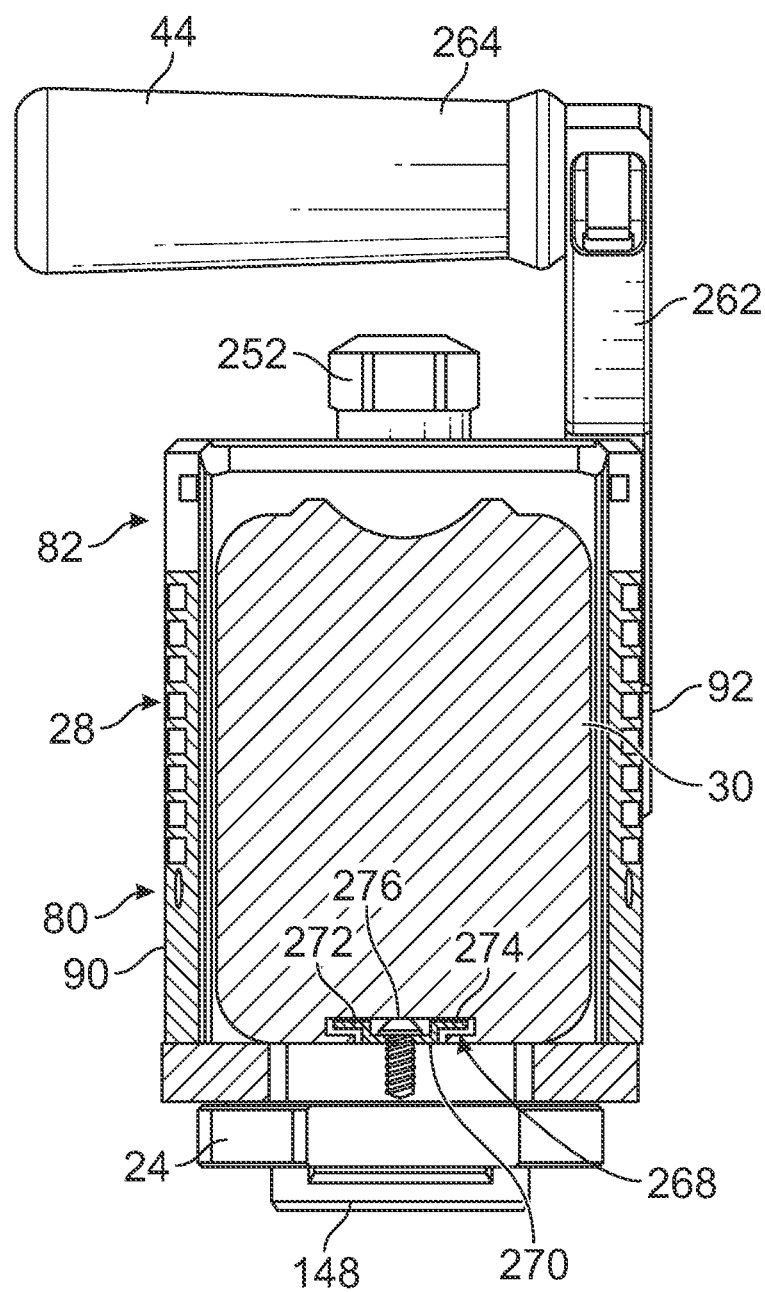
FIG. 25 is a partial cross-sectional view of the valve operating machine.

As best shown in FIGS. 8 and 25, a cleat 268 is attached to the upper surface 24*c* of the second intermediate section 50 of the base 24 so that the battery 30 can be removably attached thereto and connected to the connector 242. The cleat 268 may be an elongated member having a generally U-shaped cross-section having a lower base wall 270 which abuts against the upper surface 24*c* of the second intermediate section 50 and L-shaped side walls 272, 274 extending from the side edges of the base wall 270. The battery 30 has a corresponding channel 276 provided in a bottom surface thereof which receives the cleat 268 to secure the battery 30 to the base 24. The battery 30 is elongated and has a central axis which aligns with the central axis 46 of the base 24 so that the weight of the battery 30 is evenly distributed on the sides of the base 24. The central axis of the battery 30 is in-line with the planetary gear spindle 150, the motor shaft 158 and the idler shaft 166. When the battery 30 is mounted on the base 24, the battery 30 engages with the connector 242 to provide power to the motor controller 238 and motor 34. The rear wall 84 further has a shoulder 278 which extends rearward, and the battery 30 seats under the shoulder 278. Since the rear wall 84 is non-metallic, the rear wall 84 electrically isolates the battery 30 from the housing 28. The cleat 268 and the base 24 further have aligned openings 280, 282 therethrough proximate to the rear end of the cleat 268.

The battery 30 has an extendable pin 284 that can be extended into the aligned openings 280, 282 to further secure the battery 30 to the cleat 268 and the base 24 by turning a key in a lock 286. A non-metallic sealing gasket 288 is also provided around the perimeter of the battery 30 to seal the battery 30 to the housing 28 and further electrically isolate the battery 30 from the housing 28. The motor controller 238 has suitable software and firmware for communication between the battery 30 and the motor 34 and additionally to the display controller 236. The battery 30 is removable from the base 24 by disengaging the pin 284 from the openings 282, 280, and sliding the battery 30 rearward along the base 24 to disengage the battery 30 from the shoulder 278, the connector 242 and from the cleat 268. After recharging, the battery 30 can be reassembled with the base 24. Alternatively, a replacement battery can be attached to the valve operating machine 20 if the first battery 30 is expended during an exercising operation. The battery 30 can be quickly and easily swapped for such a new battery during use.

In an embodiment, the battery 30 has a start button 290 which is activated by the operator to start operation of the valve operating machine 20.

The battery 30 provides all of the power needed by the valve operating machine 20 to operate such that the valve operating machine 20 is self-contained and does not rely upon an external power source.

Because of the packaging of the valve operating machine 20 with the parallel planetary gear spindle 150, the motor shaft 158 and the idler shaft 166 and the in-line battery 30, the valve operating machine 20 is compact in form and allows the valve operating machine 20 to be easily carried by an operator to a jobsite.

In use, the operator carries the valve operating machine 20 from the truck to the jobsite. The operator can easily carry the valve operating machine 20 with one hand by grasping the second handle 44. The operator positions the valve operating machine 20 over the valve 22 to be exercised. The key 152 is inserted into the output socket 148 and the height of the key 152 is adjusted so that the valve operating machine 20 is at an ergonomic height for the operator. Once positioned, the operator grasps both handles 26, 44 and engages the start button 290. With the thumb of the one hand, the operator controls the rotation of the key 152 to exercise the valve 22 by toggling the control switch 266. The display 42 is easily viewable by the operator since the display 42 is not blocked from view by the handle 44. In addition, because the operator's hand is over the display 42 when grasping the handle 44, the operator's hand can block the sun from shining onto the display 42 for better viewing of the display in sunny conditions. The first and second handles 26, 44 are spaced apart from each other at a sufficient distance so that the operator can easily steady the valve operating machine 20 during use.

In some embodiments, the valve operating machine 20 further includes a torque management system to assist the operator in managing torque generated by the valve operating machine 20 as shown in FIGS. 26-41.

Figure 29:
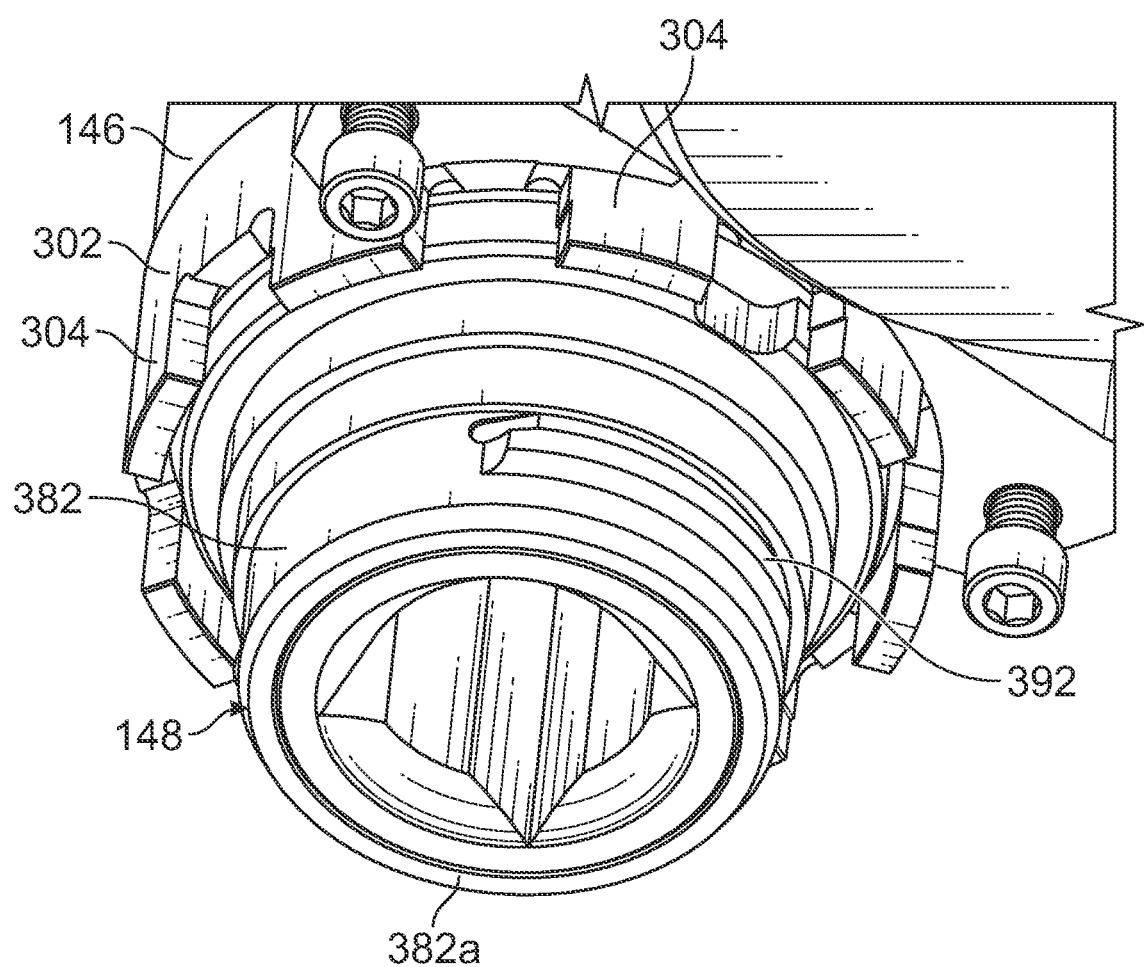
FIG. 29 is a lower perspective view of the output socket attached to the housing.

As part of the torque management system and as shown in FIG. 29, the planetary gearbox housing 146 has a cylindrical outer surface 302 with a plurality of spaced apart projections 304 extending from a lower end thereof. Each projection 304 is curved to fall along an imaginary circle, and may have a generally square shape. The front pocket 60 of the base 24 has a plurality of recesses 306, see FIGS. 8 and 9, which accept the projections 304 therein. The engagement of the projections 304 within the recesses 306 of the base 24 prevents the planetary gearbox housing 146 from rotating relative to the base 24. Any torque generated by the three-stage planetary gear system 144 of the planetary gearbox 32 is transferred to the planetary gearbox housing 146 and then to the base 24 through the engagement of the projections 304 within the recesses 306 of the base 24.

In a first embodiment of the torque management system shown in FIGS. 26-37, the torque management system includes a torque arm assembly 308 which can be selectively attached to the base 24 and to the output socket 148 in two different positions. In an embodiment, the torque arm assembly 308 includes a torque arm 310, a ring lock 312, and a split retaining snap ring 314. The ring lock 312 is secured to the torque arm 310 by the retaining snap ring 314 and is rotatable relative to the torque arm 310.

The torque arm 310 is a rigid and elongated plate having first and second opposite ends 310a, 310b, a planar upper surface 310c, and a lower surface 310d which may be planar. A central axis 316 extends from the first end 310a to the second end 310b. The torque arm 310 includes a first section 318 which extends from the first end 310a rearwardly and a second section 320 which extends from a rear end of the first section 318 rearwardly to the second end 310b. The first section 318 is generally rectangular when viewed looking at the upper surface 310c thereof. The second section 320 may be tapered.

Figure 30:
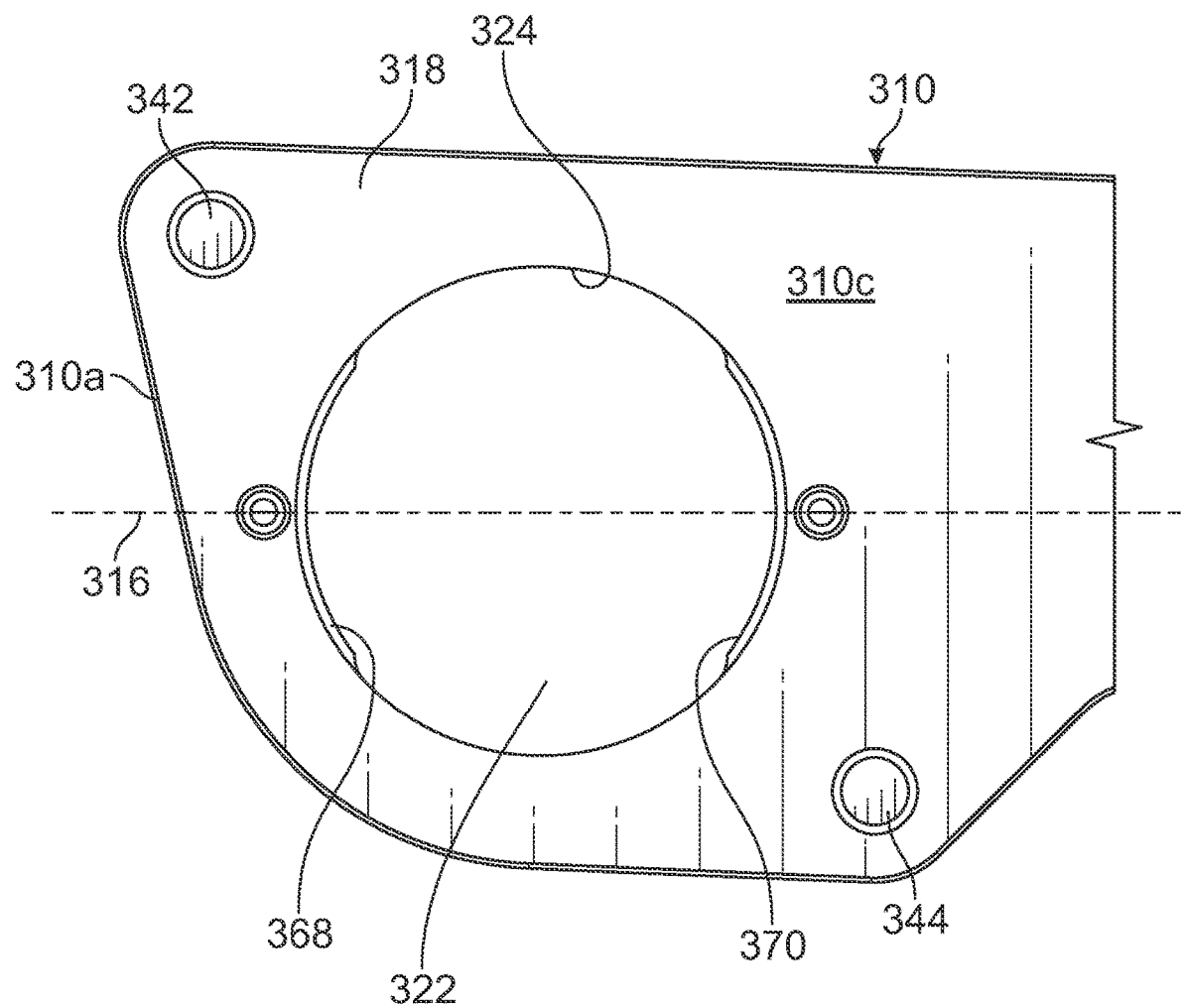
FIG. 30 is a partial top plan view of the torque management system of FIG. 26.
Figure 31:
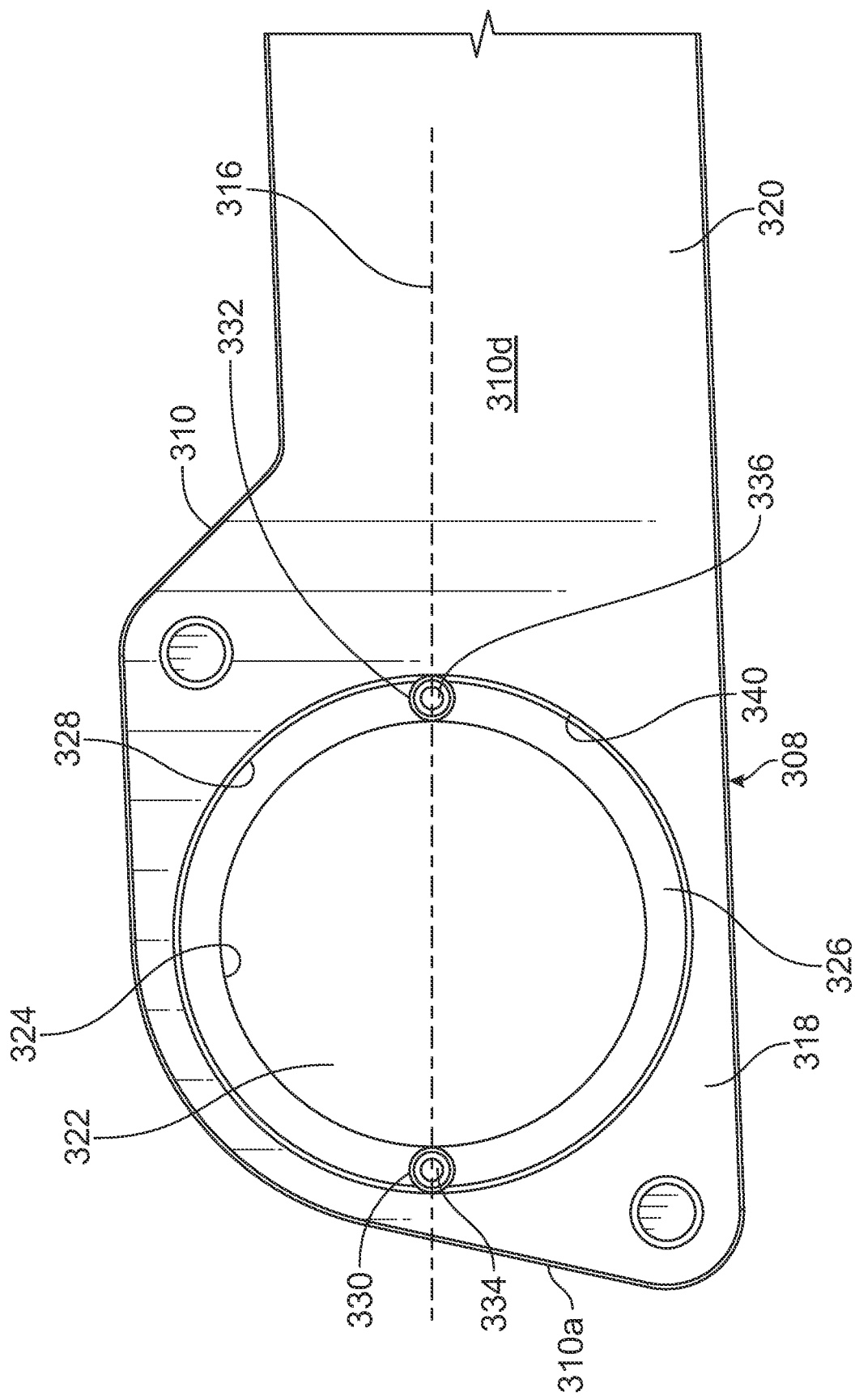
FIG. 31 is a partial bottom plan view of a torque arm of the torque management system of FIG. 26.

As best shown in FIGS. 30 and 31, a passageway 322 is provided through the first section 318 from the upper surface 310c to the lower surface 310d and proximate to the first end 310a of the torque arm 310. A center of the passageway 322 aligns with the central axis 316 of the secondary torque arm 310. The passageway 322 has an upper cylindrical wall surface 324 which extends downwardly from the upper surface 310c to an intermediate wall surface 326 which is parallel to the planar upper surface 310c, and a lower cylindrical wall surface 328 which extends downwardly from the intermediate cylindrical wall surface 326 to the lower surface 310d. The lower cylindrical wall surface 328 has a diameter which is greater than the diameter of the upper cylindrical wall surface 324.

The intermediate wall surface 326 has a pair of bores 330, 332 therein. The bores 330, 332 extend upwardly from the intermediate wall surface 326 toward the upper surface 310c. The bores 330, 332 are diametrically opposed from each other relative to the center of the passageway 322 and are aligned with the axis 316. A spring-loaded ball 334, 336 is mounted in the respective bore 330, 332. The balls 334, 336 are naturally biased outwardly from the lower surface 310d by their springs 338, but cannot completely exit the bores 330, 332.

The lower cylindrical wall surface 328 has a snap ring mounting recess 340 therein which is spaced from the lower surface 310d.

Figure 28:
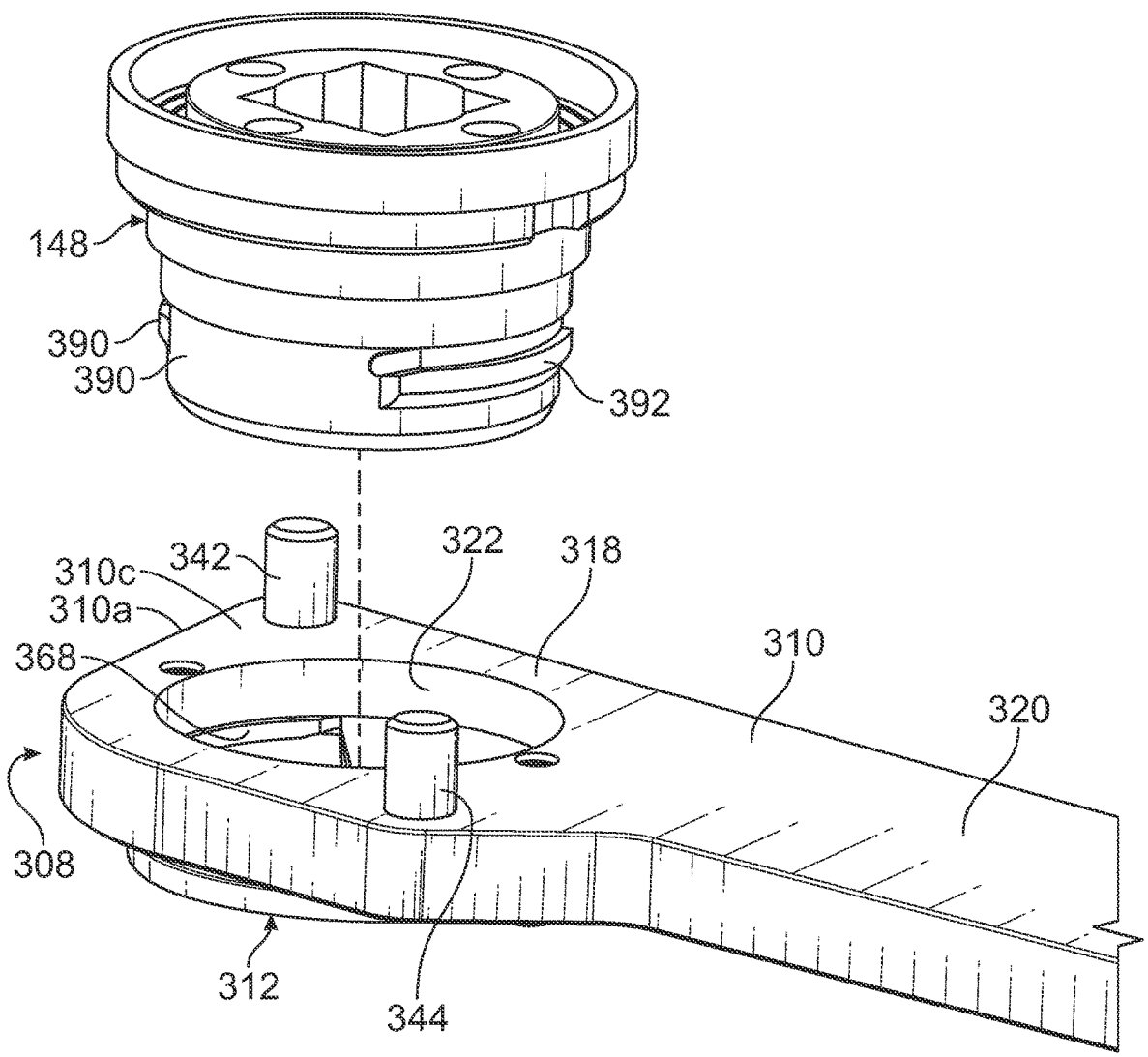
FIG. 28 is a partial, exploded, perspective view of an output socket of the valve operating machine and the torque management system of FIG. 26.

A pair of pins 342, 344, see FIG. 28, extend upwardly from the upper surface 310c of the first section 318 and are diametrically opposed from each other relative to the center of the passageway 322. The pins 342, 344 may be radially spaced from the center of the passageway 322 at the same distance. The pins 342, 344 are offset from the central axis 316 of the secondary torque arm 310, with pin 342 on one side of the central axis 316 and proximate to the first end 310a, and the pin 344 on other side of the central axis 316 and proximate to the second section 320. The pins 342, 344 may have chamfers on the free ends thereof.

Figure 26:
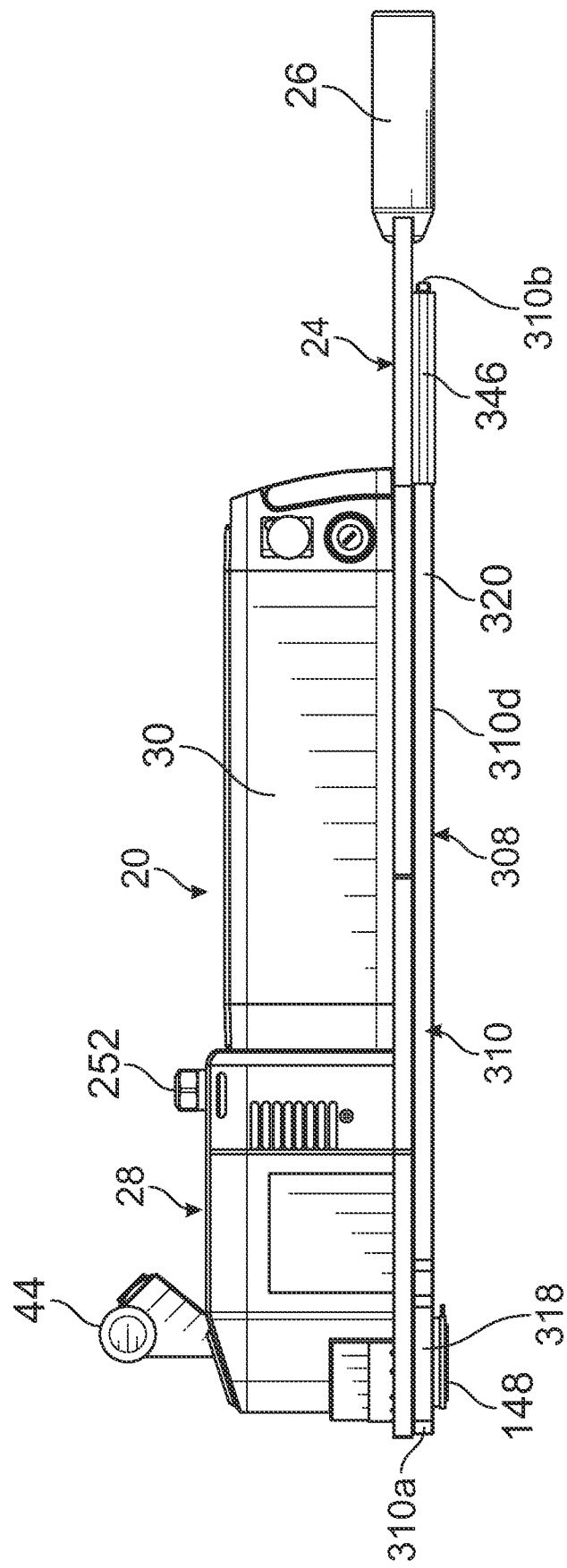
FIG. 26 is a side elevation view of the valve operating machine having a torque management system mounted thereto in accordance with a first embodiment.
Figure 27:
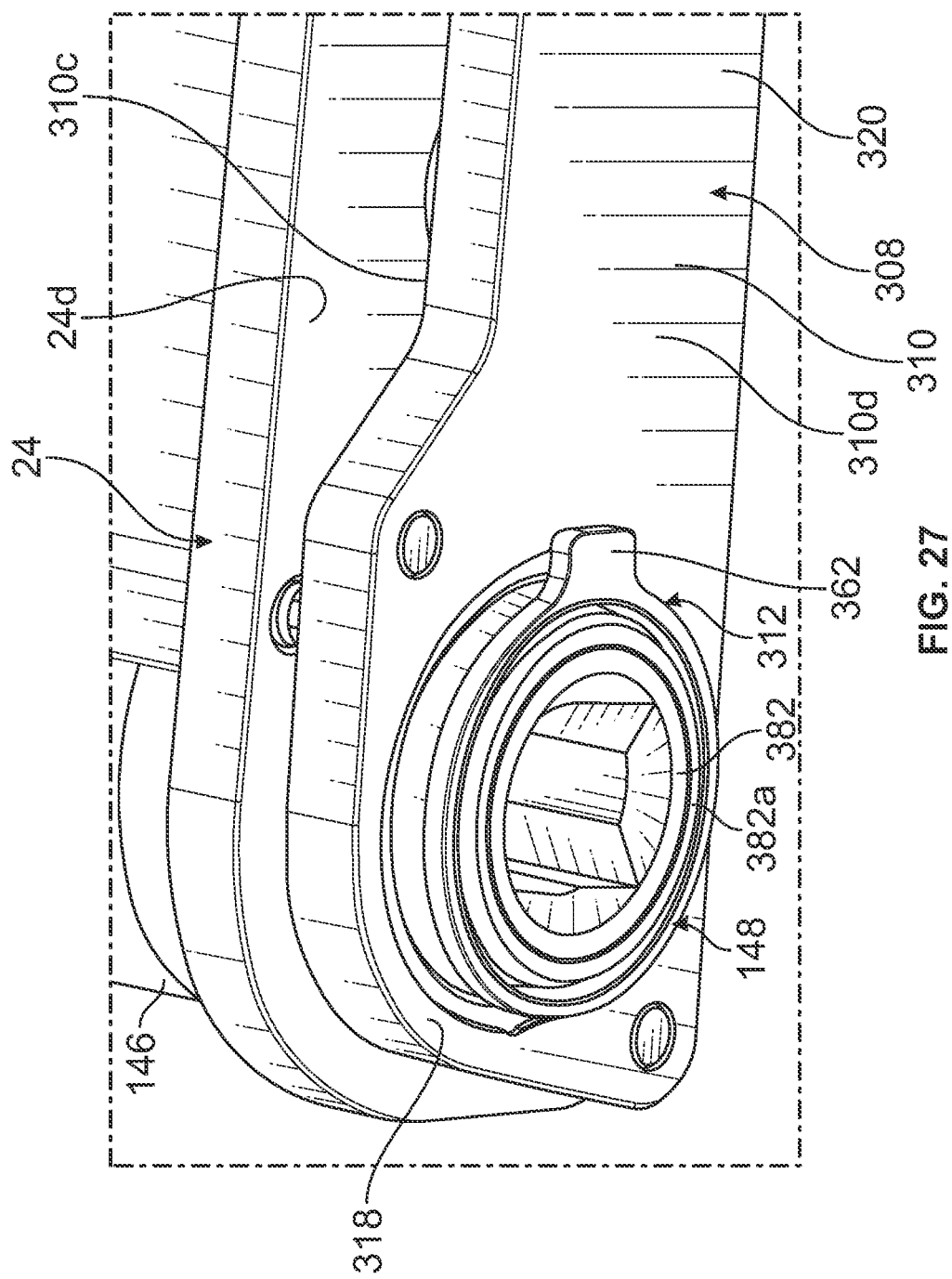
FIG. 27 is a partial perspective view of the valve operating machine having the torque management system of FIG. 26 mounted thereto and in a storage position.

A handle 346, see FIG. 26, which includes a grip material covers the second end 310b of the torque arm 310. The handle 346 may include a cushion to provide the operator with a more comfortable grip.

Figure 32:
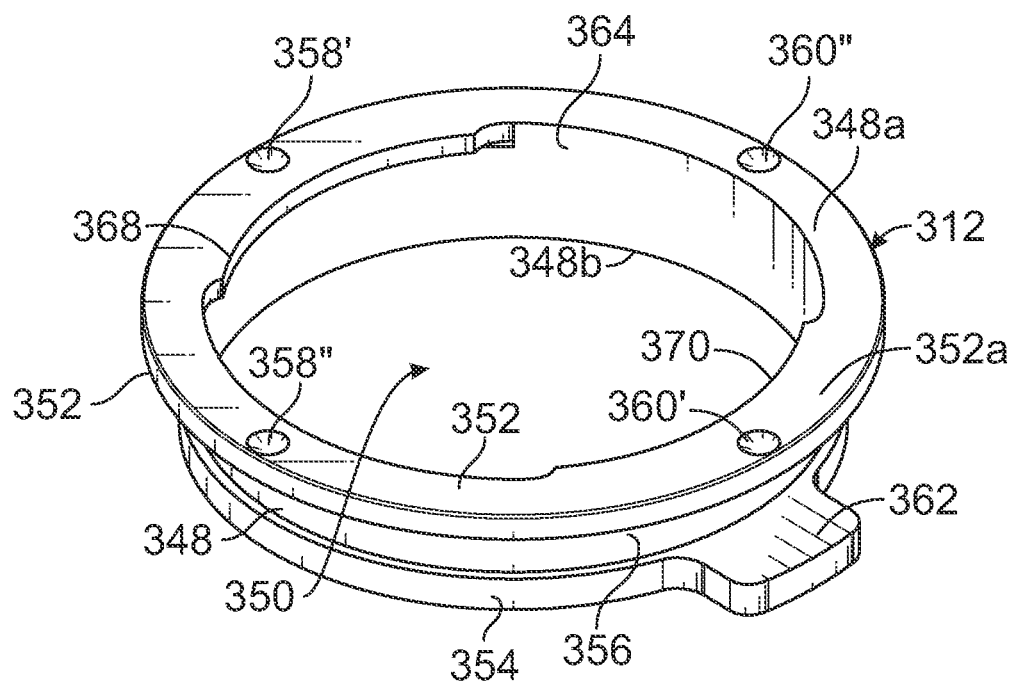
FIG. 32 is a perspective view of a ring lock of the torque management system of FIG. 26.
Figure 33:
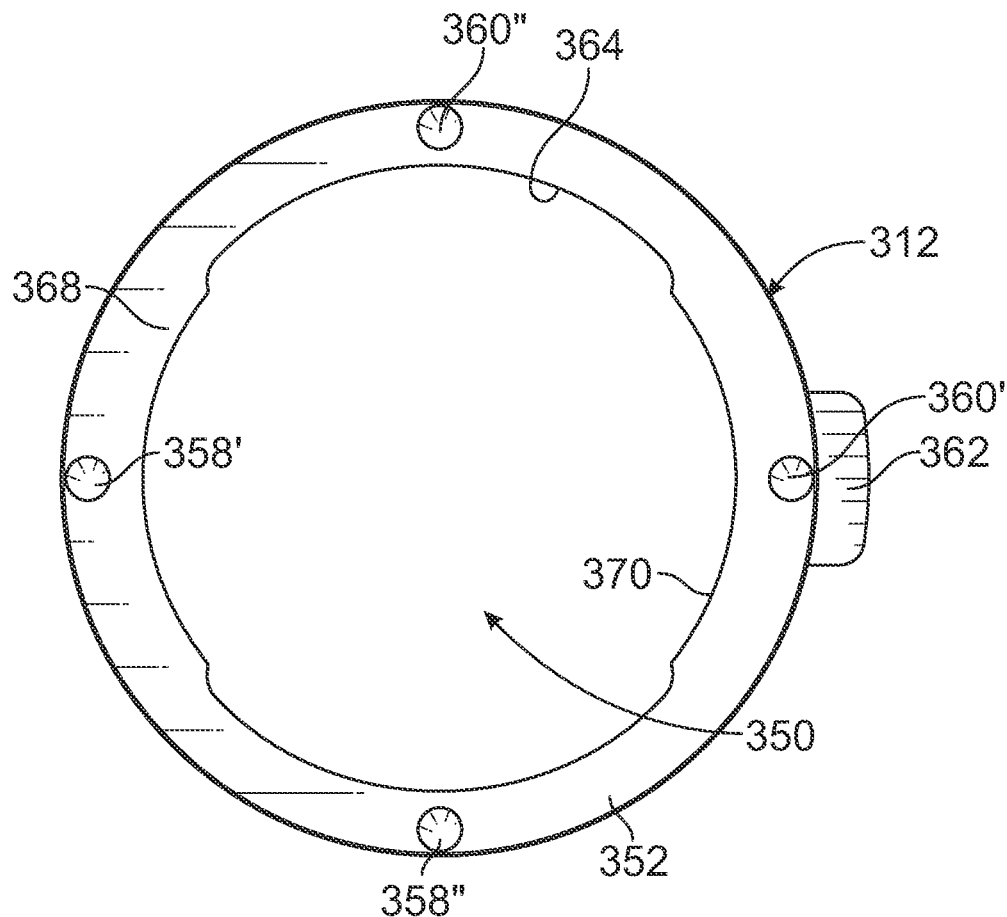
FIG. 33 is a top plan view of the ring lock.

The ring lock 312 is best shown in FIGS. 32 and 33. The ring lock 312 has a cylindrical wall 348 having upper and lower ends 348a and which defines a passageway 350 extending from the upper end 348a to the lower end 348b. An upper cylindrical flange 352 extends radially outwardly from the wall 348 proximate to the upper end 348a, and a lower cylindrical flange 354 extends radially outwardly from the wall 348 proximate to the lower end 348a such that a recess 356 is formed by the wall 348 and the flanges 352, 354. An upper end 352a of the upper flange 352 is planar and has four spaced apart indentations 358', 358", 360', 360" therein. Indentations 358', 360' are diametrically opposed to each other, and indentations 358", 360" are diametrically opposed to each other. A tab 362 extends radially outwardly from the lower cylindrical flange 354. In an embodiment, a center of the tab 362 longitudinally aligns with the indentations 358', 360'.

The passageway 350 is formed by an inner cylindrical wall surface 364 of the cylindrical wall 348, with the exception of pair of spaced apart projections 368, 370 which extend inwardly therefrom. The projections 368, 370 are proximate to the upper end 348a of the cylindrical wall 348 and fall along the same imaginary circle. In an embodiment, centers of the projections 368, 370 longitudinally aligns with the indentations 358', 360' and the center of the tab 362.

The torque arm assembly 308 is assembled by inserting the ring lock 312 into the passageway 322 of the torque arm 310 with the upper flange 352 engaging against the wall surfaces 324, 326. The split retaining snap ring 314 is compressed and inserted between the ring lock 312 and the lower cylindrical wall surface 328 and is inserting into the snap ring mounting recess 340 of the torque arm 310. The retaining snap ring 314 expands and seats within the snap ring mounting recess 340 and engages against the lower surface of upper flange 352, thereby securing the ring lock 312 to the torque arm 310. If the ring lock 312 is inserted such that the balls 334, 336 do not align with one set of the indentations 358', 360' or 358", 360", then the springs 338 are compressed and the balls 334, 336 are within the bores 330, 332. If the ring lock 312 is inserted such that the balls 334, 336 align with one set of the indentations 358', 360' or 358", 360", then the springs 338 are expanded and the balls 334, 336 extend partially out of the bores 330, 332 and into the appropriate set of indentations 358', 360' or 358", 360". The ring lock 312 can rotate relative to the torque arm 310 when an operator grasps the tab 362 and rotates the ring lock 312. If the balls 334, 336 are seated within one of the set of indentations 358', 360' or 358", 360", upon rotation of the ring lock 312, the balls 334, 336 are biased out of the one set of indentations 358', 360' or 358", 360" and into engagement with the planar upper end 352a of the upper flange 352 until the balls 334, 336 are aligned with the other set of indentations 358', 360' or 358", 360". The indentations 358', 360', 358", 360" are preferably set such that a quarter turn of the ring lock 312 engages the balls 334, 336 with the two sets of indentations 358', 360' or 358", 360".

The torque management system further has a pair of passageways 372, 374, see FIGS. 8 and 9, through the first section 48 of the base 24. Each passageway 372, 374 extends from the upper surface 24c to the lower surface 24d. The passageways 372, 374 are radially outward of the central passageway 62 of the first section 48 and are diametrically opposed to each other relative to the center of the first section 48. The passageways 372, 374 may be radially spaced from the center of the passageway 322 at the same distance, and are spaced from each other by the same distance the pins 342, 344 are separated from each other. Like the pins 342, 344, the passageways 372, 374 are offset from the central axis 46 of the base 24, with passageway 372 on one side of the central axis 46 and proximate to the front end 24a, and the passageway 374 on other side of the central axis 46 and proximate to the second section 50.

Figure 34:
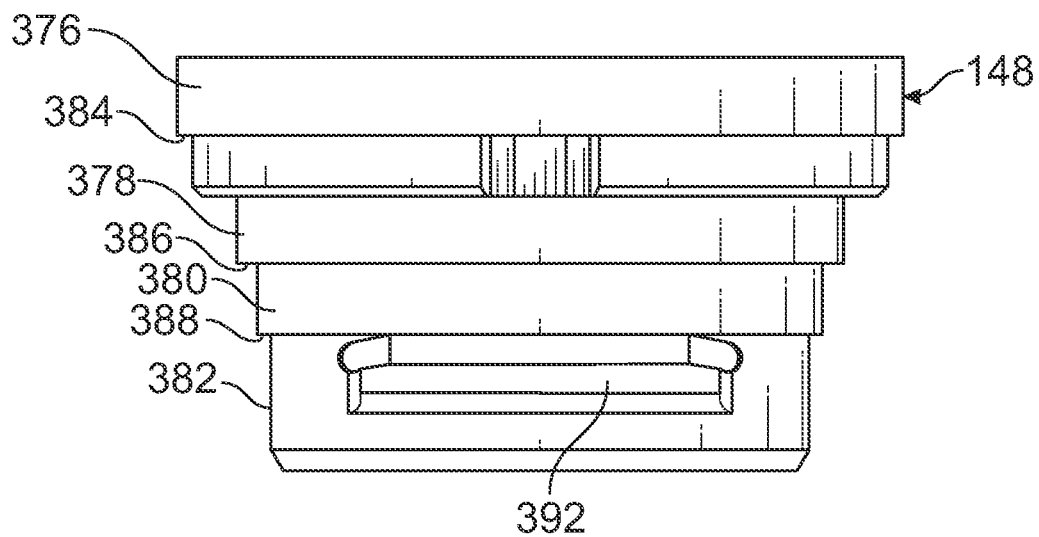
FIG. 34 is a side elevation view of the output socket.
Figure 35:
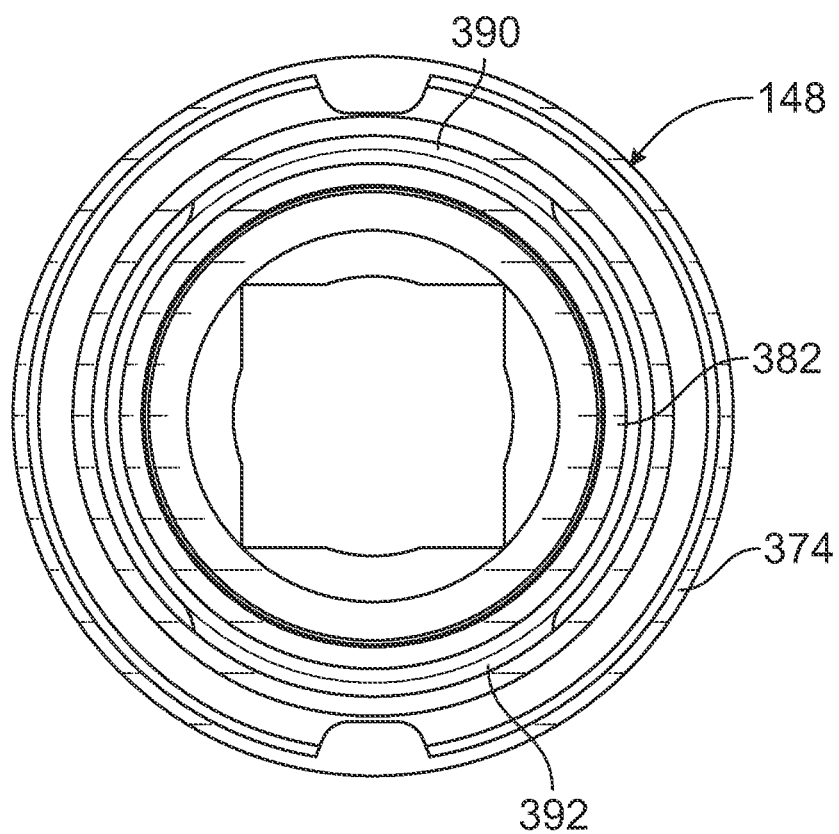
FIG. 35 is a bottom plan view of the output socket.
Figure 36:
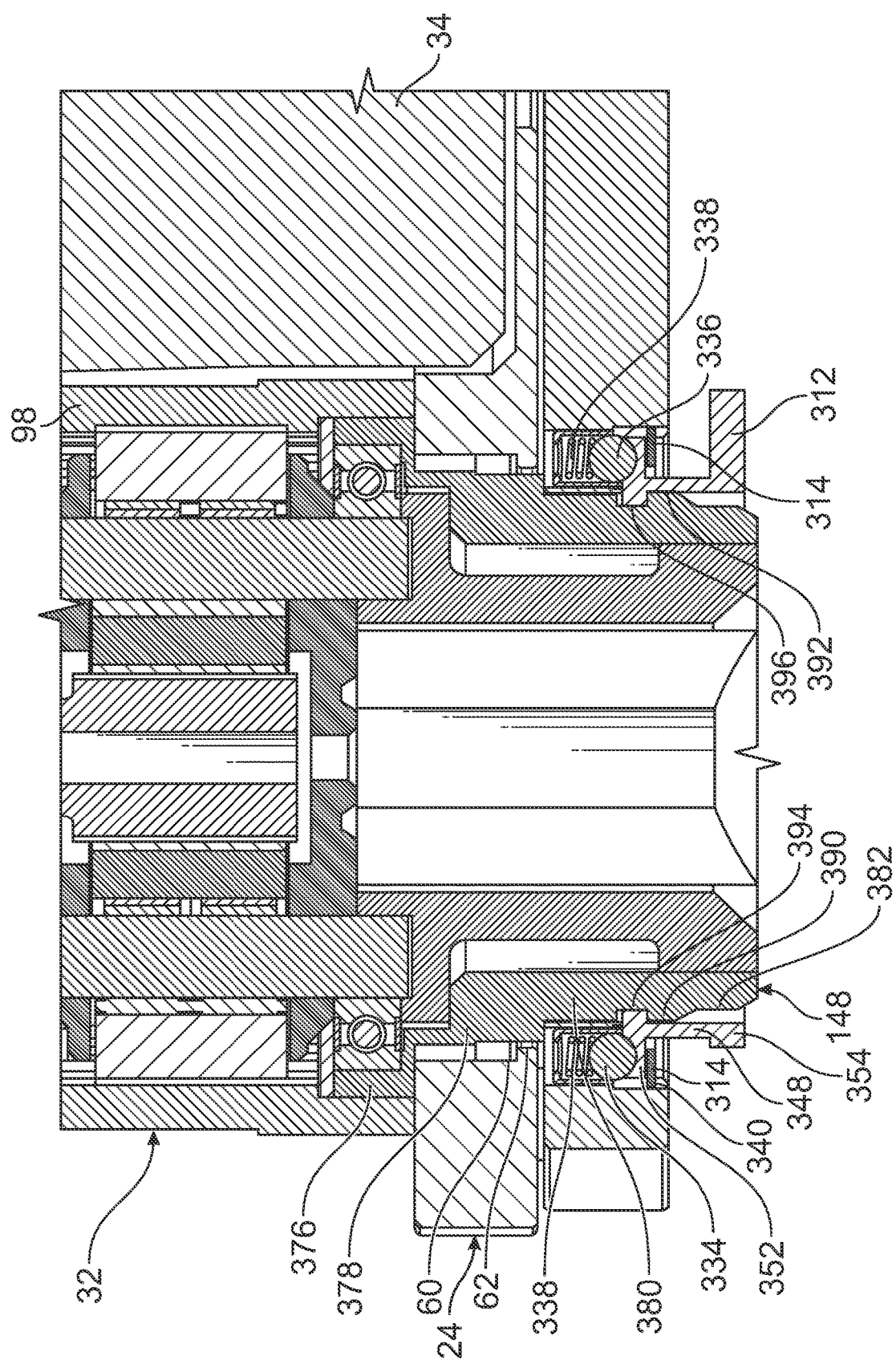
FIG. 36 is a partial cross-sectional view of the valve operating machine and the torque management system of FIG. 26 in the storage position.
Figure 37:
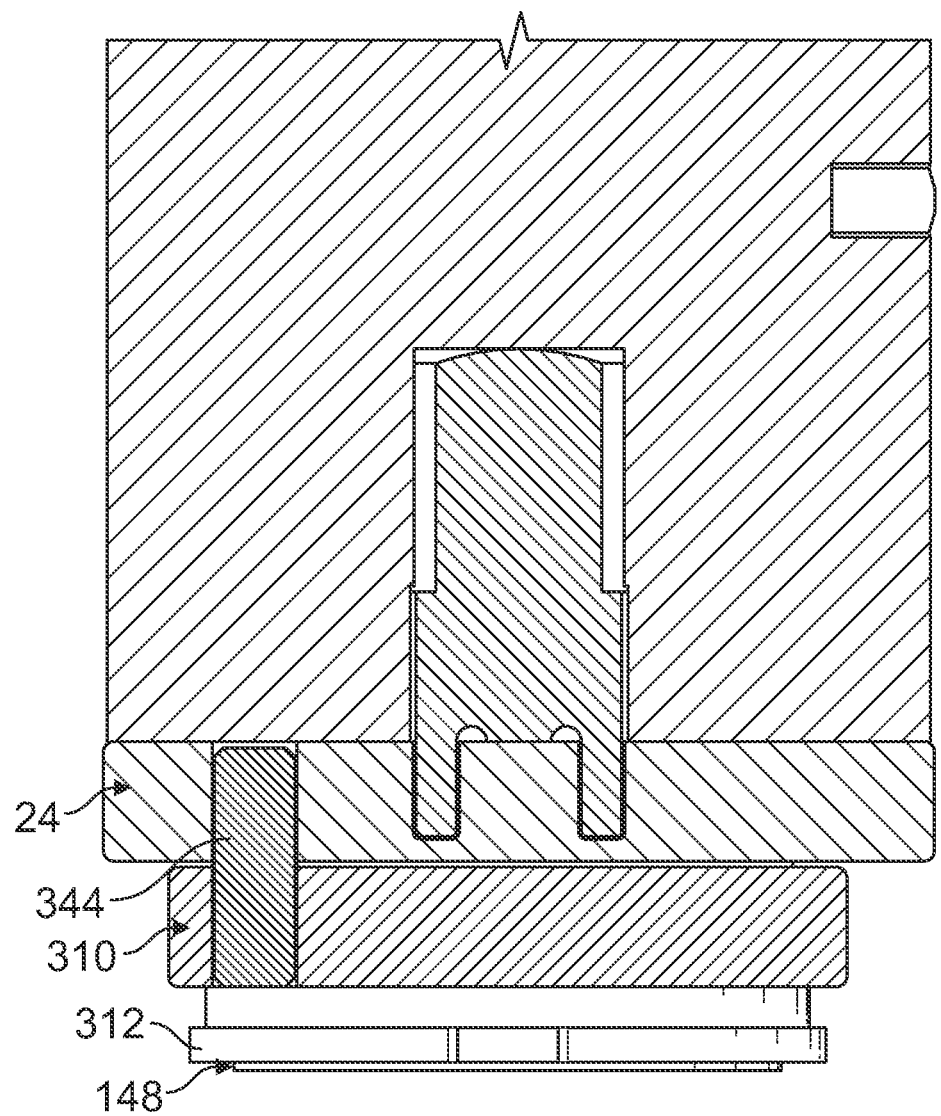
FIG. 37 is another cross-sectional view of the valve operating machine and the torque management system of FIG. 26 in the storage position.
Figure 38:
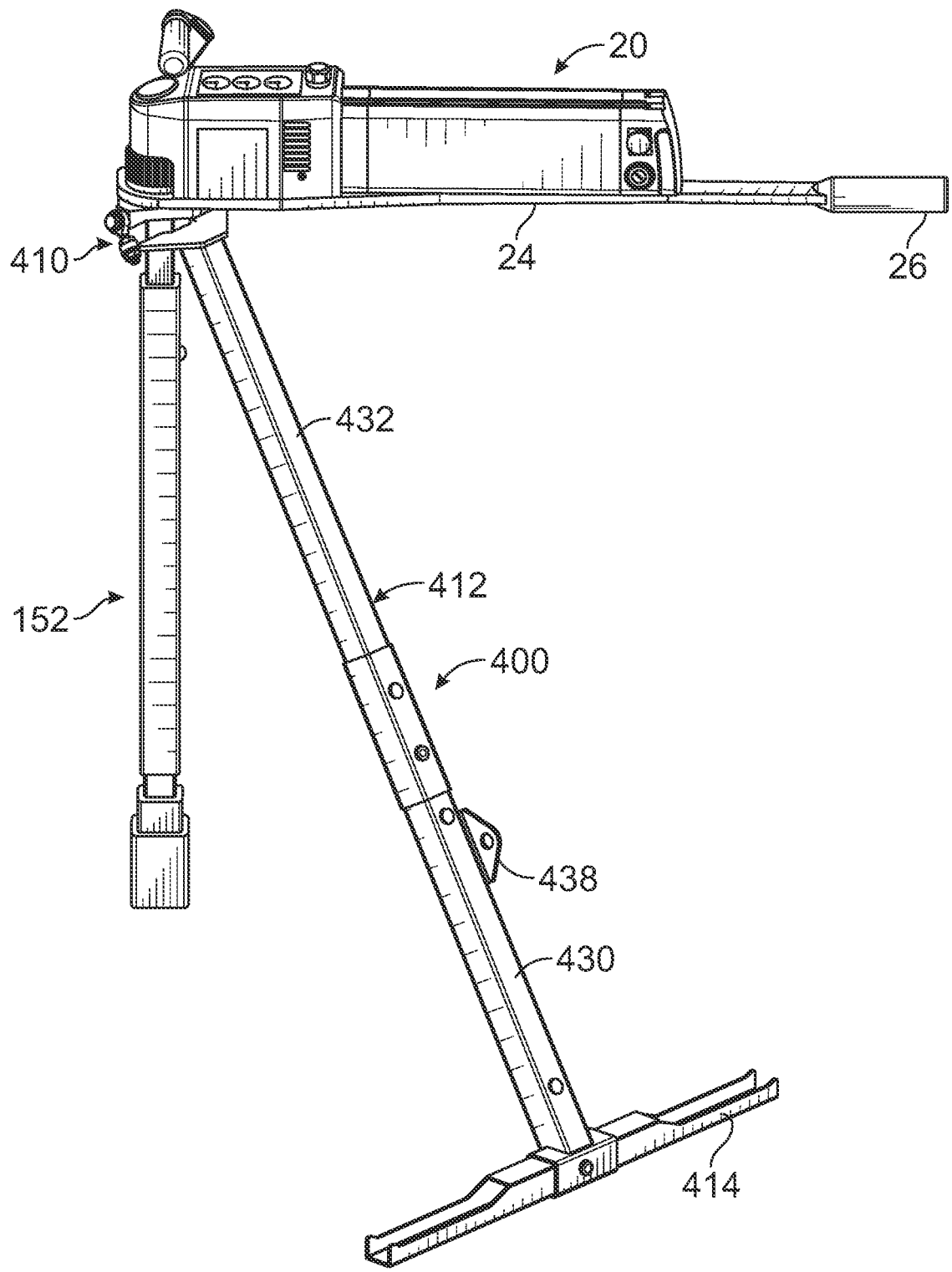
FIG. 38 is a perspective view of the valve operating machine having a torque management system mounted thereto in accordance with a second embodiment.

As shown in FIGS. 34 and 35, the output socket 148 has a first, upper cylindrical section 376, a second section 378 which extends downwardly from the first section 376 and may be formed of two adjoining cylindrical portions, a third cylindrical section 380 which extends downwardly from the second section 378, and a fourth, lower cylindrical section 382 which extends downwardly from the third section 380. The diameters of the sections 376, 378, 380, 382 decrease from the first section 376 to the fourth section 382 such that respective shoulders 384, 386, 388 are formed. A pair of spaced apart projections 390, 392 extend outwardly from the fourth section 382. The projections 390, 392 are diametrically opposed to each other and fall along the same imaginary circle. The projections 390, 392 from are spaced upwardly from a lower end 382a of the fourth section 382. The projections 390, 392 and the shoulder 388 form pockets 394, 396 therebetween.

The output socket 148 seats with the base 24 such that the shoulder 384 engages the upper surface 24c of the first section 48, and the second section 378 passes through the front pocket 60 and central passageway 62 of the base 24. The third and fourth sections 380, 382 extend downward from the lower surface 24d of the base 24.

The torque arm assembly 308 can be assembled with the base 24 and the output socket 148 in two different positions. In a first position, the torque arm assembly 308 is a storage position, and in a second position, the torque arm assembly 308 is an operational position.

To assemble the torque arm assembly 308 in the storage position with the base 24 and the output socket 148, the torque arm 310 is positioned under the base 24 such that the first end 310a of the torque arm 310 is proximate to the front end 24a of the base 24, the second end 310b of the torque arm 310 is proximate to the rear end 24b of the base 24, and the torque arm 310 is under the base 24. The pin 342 aligns with passageway 372, and the pin 344 aligns with passageway 374. The ring lock 312 is rotated relative to the torque arm 310 such that projections 368, 370 on the ring lock 312 are misaligned with the projections 390, 392 on the output socket 148 and the spring-loaded balls 334, 336 are within the indentations 358", 360". The torque arm assembly 308 is then pushed upward over the third and fourth sections 380, 382 of the output socket 148 until the upper surface 310c of the torque arm 310 engages with the lower surface 24d of the base 24 and the shoulder 388 of the output socket 148, the pin 342 seats with the passageway 372, and the pin 344 seats within the passageway 374. The pins 342, 344 and the passageways 372, 374 form a mating assembly which prevents rotational movement of the torque arm 310 relative to the base 24. Thereafter, the ring lock 312 is rotated relative to the torque arm 310 by the operator grasping the tab 362 which causes the spring-loaded balls 334, 336 to move out of the indentations 358", 360" and into the indentations 358', 360'. This provides a tactile feel for the operator. This also causes the projections 368, 370 on the ring lock 312 to move into the pockets 394, 396 formed between the projections 390, 392 and the shoulder 388 of the output socket 148. As a result, the torque arm assembly 308 in locked into the storage position. The projections 368, 370 on the ring lock 312 and the pockets 394, 396 in the output socket 148 form a locking assembly. The torque arm 310 acts as a mounting plate to mount the torque arm assembly 308 to the base 24 and the output socket 148. The central axis 46 of the base 24 and the central axis 316 of the torque arm 310 are parallel to each other.

To remove the torque arm assembly 308 from the base 24 and the output socket 148 when in the storage position, the ring lock 312 is rotated relative to the torque arm 310 by the operator grasping the tab 362 which causes the spring-loaded balls 334, 336 to move out of the indentations 358', 360' and into the indentations 358", 360". This provides a tactile feel for the operator. This also causes the projections 368, 370 on the ring lock 312 to move out of the pockets 394, 396 formed between the projections 390, 392 and the shoulder 388 of the output socket 148. Thereafter, the torque arm assembly 308 is pulled downward from the base 24 and the output socket 148.

To assemble the torque arm assembly 308 in the operational position with the base 24 and the output socket 148, the torque arm 310 is positioned under the base 24 such that the second end 310b of the torque arm 310 is proximate to the front end 24a of the base 24. The pin 342 aligns with passageway 374, and the pin 344 aligns with passageway 372. The ring lock 312 is rotated relative to the torque arm 310 such that projections 368, 370 on the ring lock 312 are misaligned with the projections 390, 392 on the output socket 148 and the spring-loaded ball 334, 336 are within the indentations 358", 360". The torque arm assembly 308 is then pushed upward over the third and fourth sections 380, 382 of the output socket 148 until the upper surface 310c of the torque arm 310 engages with the lower surface 24d of the base 24 and the shoulder 388 of the output socket 148, the pin 342 seats with the passageway 374, and the pin 344 seats within the passageway 372 thereby preventing rotational movement of the torque arm 310 relative to the base 24. Thereafter, the ring lock 312 is rotated relative to the torque arm 310 by the operator grasping the tab 362 which causes the spring-loaded balls 334, 336 to move out of the indentations 358", 360" and into the indentations 358', 360'. This provides a tactile feel for the operator. This also causes the projections 368, 370 on the ring lock 312 to move into the pockets 394, 396 formed between the projections 390, 392 and the shoulder 388 of the output socket 148. The central axis 46 of the base 24 and the central axis 316 of the torque arm 310 are parallel to each other. As a result, the torque arm assembly 308 in locked into the operational position. The torque arm 310 acts as a mounting plate to mount the torque arm assembly 308 to the base 24 and the output socket 148.

To remove the torque arm assembly 308 from the base 24 and the output socket 148 when in the operational position, the ring lock 312 is rotated relative to the torque arm 310 by the operator grasping the tab 362 which causes the spring-loaded balls 334, 336 to move out of the indentations 358', 360' and into the indentations 358", 360". This provides a tactile feel for the operator. This also causes the projections 368, 370 on the ring lock 312 to move out of the pockets 394, 396 formed between the projections 390, 392 and the shoulder 388 of the output socket 148. Thereafter, the torque arm assembly 308 is pulled downward from the base 24 and the output socket 148.

In use, the operator carries the valve operating machine 20 from the truck to the jobsite with the torque arm assembly 308 attached to the base 24 and the output socket 148 in the storage position. The operator can easily carry the valve operating machine 20 with one hand by grasping the second handle 44. If the torque arm assembly 308 is to be used, the torque arm assembly 308 is moved to the operational position. The operator then positions the valve operating machine 20 over the valve 22 to be exercised. The key 152 is inserted into the output socket 148 and the height of the key 152 is adjusted so that the valve operating machine 20 is at an ergonomic height for the operator. Once positioned, a first operator grasps both handles 26, 44 and a second operator grasps the handle 346. The first operator engages the start button 290. With the thumb of the one hand, the first operator controls the rotation of the key 152 to exercise the valve 22 by toggling the control switch 266. The display 42 is easily viewable by the first operator since the display 42 is not blocked from view by the handle 44. In addition, because the first operator's hand is over the display 42 when grasping the handle 44, the first operator's hand can block the sun from shining onto the display 42 for better viewing of the display in sunny conditions. The operators are spaced apart from each other at a sufficient distance so that the operators can easily steady the valve operating machine 20 during use and counteract any torque generated.

While the mating assembly is shown with the pins 342, 344 on the torque arm 310 and the passageways 372, 374 in the base 24, the pins 342, 344 can be on the base 24 and the passageways 372, 374 in the torque arm 310. While the locking assembly is shown with the projections 368, 370 on the ring lock 312 and the pockets 394, 396 in the output socket 148, the projections 368, 370 can be provided on the output socket 148 and the pockets 394, 396 can be formed in the ring lock 312. Likewise, while the spring-loaded balls 334, 336 are shown as being on the torque arm 310 and the indentations 358', 360', 358", 360" in the ring lock 312, the spring-loaded balls 334, 336 can be on the ring lock 312 and the indentations 358', 360' or 358", 360" on the torque arm 310.

In a second embodiment of the torque management system as shown in FIGS. 38-41, the torque management system includes a stand assembly 400 which can be selectively attached to the base 24 and to the output socket 148. In an embodiment, the stand assembly 400 includes a mounting plate 410, a leg assembly 412 attached to the mounting plate 410, a detachable foot 414, the ring lock 312, and the split retaining snap ring 314 (which is not shown in the stand assembly 400). The ring lock 312 is secured to the mounting plate 410 by the retaining snap ring 314 and is rotatable relative to the mounting plate 410. The mounting plate 410 has a snap ring mounting recess therein like the snap ring mounting recess 340 of the torque arm 310 for this purpose.

In an embodiment, the mounting plate 410 includes an upper plate 416 attached to a lower plate 418 by screws 420 which can be rotated to adjust the position of the lower plate 418 relative to the upper plate 416. Alternatively, the mounting plate 410 may be integrally formed of one piece.

The upper plate 416 is identically formed to the first section 318 of the torque arm 310, and includes the passageway 322, the pins 342, 344 and the spring-loaded ball 334, 336 of the torque arm 310. As such, the specifics are not repeated herein and like reference numerals are used. The lower plate 418 is a rigid plate having a planar upper surface 418c, and a planar lower surface 418d. A cutout 422 may be provided in the lower plate 418 and extends from the upper surface 418c to the lower surface 418d, and aligns with the passageway 322 in the upper plate 416 when viewed from above. The cutout 422 is large enough so that the passageway 322 in the upper plate 416 is not obstructed by the lower plate 418 at all positions of the lower plate 418 relative to the upper plate 418. The screws 420 may be connected to extensions 424 extending downwardly from the upper plate 416, and connected to extensions 426 extending from the lower plate 418 at an angle relative thereto.

The leg assembly 412 includes an elongated first member 430 and an elongated second member 432, which telescopes outwardly from the first member 430. Each first and second member 430, 432 may be formed of a generally hollow tube with a rectangular cross-section. In an example, the second member 432 has outer dimensions which are slightly smaller than the inner dimensions of the first member 430 such that the second member 432 seats within the first member 430 and will not rotate axially with respect to the first member 430. An upper end of the second member 432 is fixedly attached to the lower plate 418. A mechanical lock 434 is provided, which, when engaged, prevents movement of the second member 432 relative to the first member 430. In an example as shown, the lock 434 is a spring-loaded button on the second member 432 which engages with one of a plurality of openings in the first member 430. When the button is engaged in one of the openings, the first and second members 430, 432 are longitudinally locked to one another; and when the button is disengaged from the opening, the second member 432 is longitudinally movable with respect to the first member 430. Alternatively, the lock 434 may be an adjustable screw with an enlarged head in the shape of a handle which is threaded into a complementarily threaded hole in the wall of the first member 430 and against the surface of the second member 432. When the screw is tightened against the second member 432, the first and second members 430, 432 are longitudinally locked to one another; and when the screw is loosened, the second member 432 is longitudinally movable with respect to the first member 430. It is to be understood that the first member 430 may instead seat within the second member 432, such that the first member 430 has outer dimensions which are slightly smaller than the inner dimensions of the second member 432 such that the first member 430 will not rotate axially with respect to the second member 432. While the leg assembly 412 is shown and described as being two telescoping members 430, 432, the telescoping leg assembly 412 can instead be formed of a single elongated member.

Figure 39:
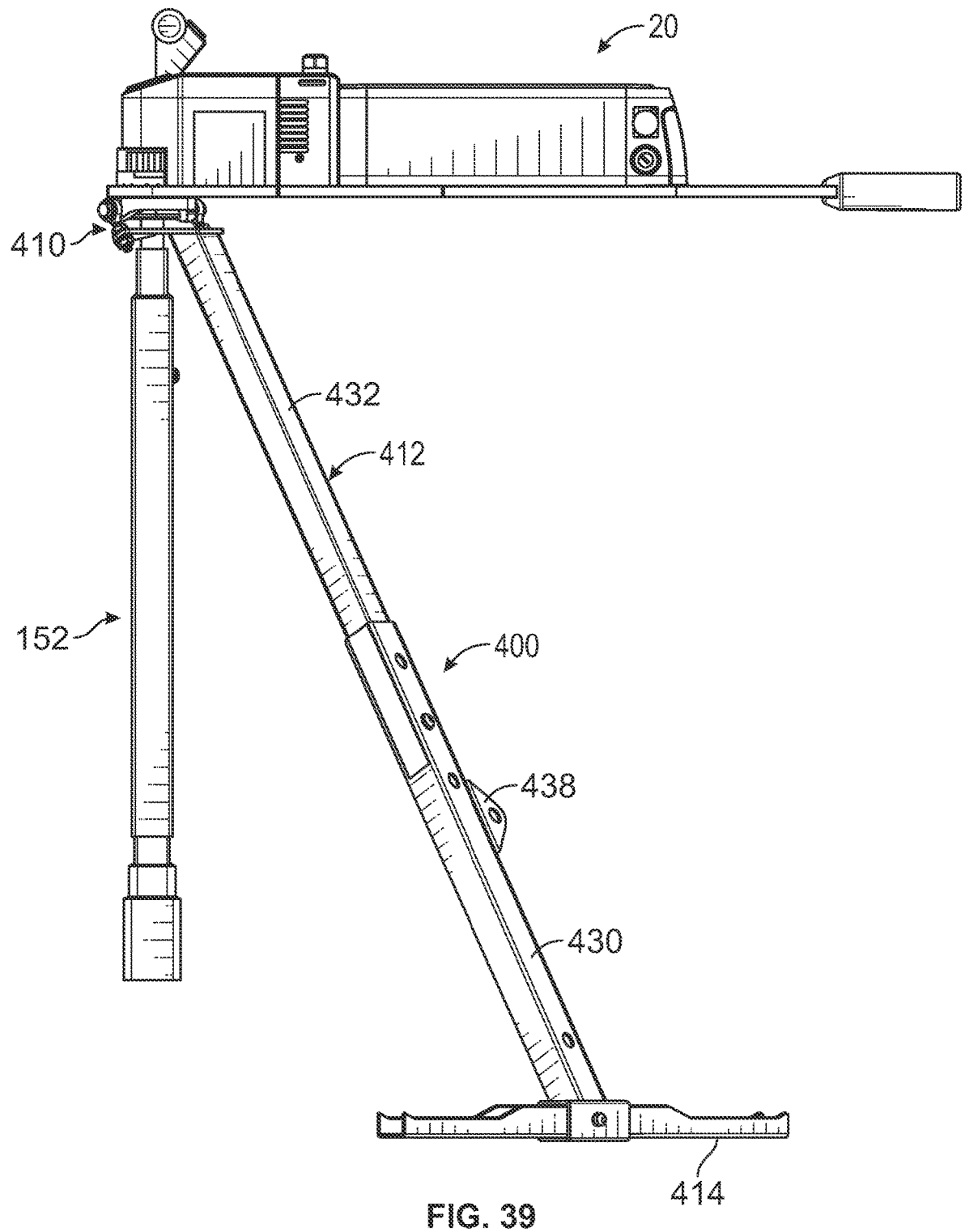
FIG. 39 is a side elevation view of the valve operating machine having a torque management system of FIG. 38 mounted thereto.
Figure 40:
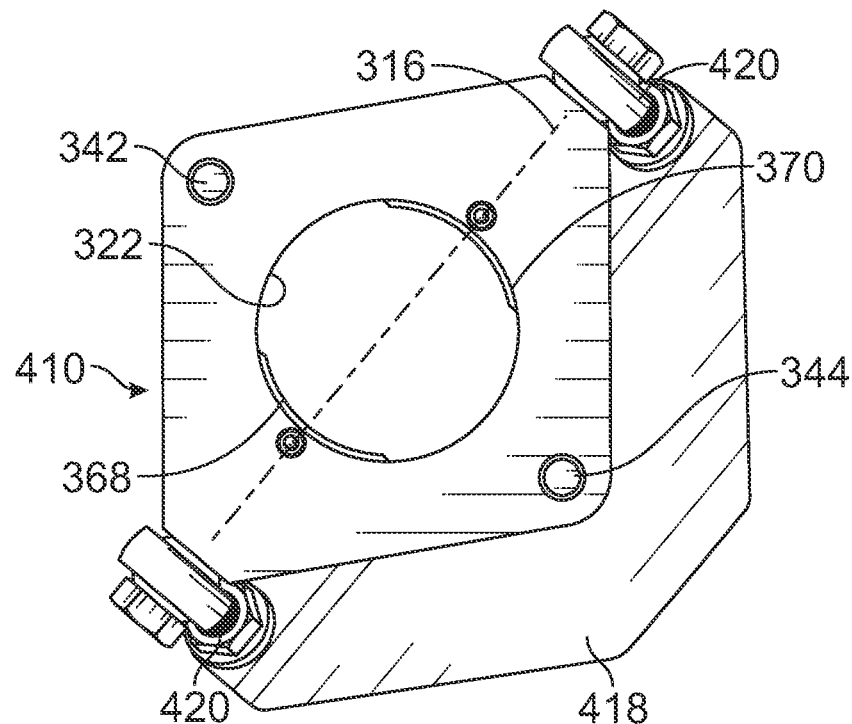
FIG. 40 is a top plan view of a mounting plate of the torque management system of FIG. 38.
Figure 41:
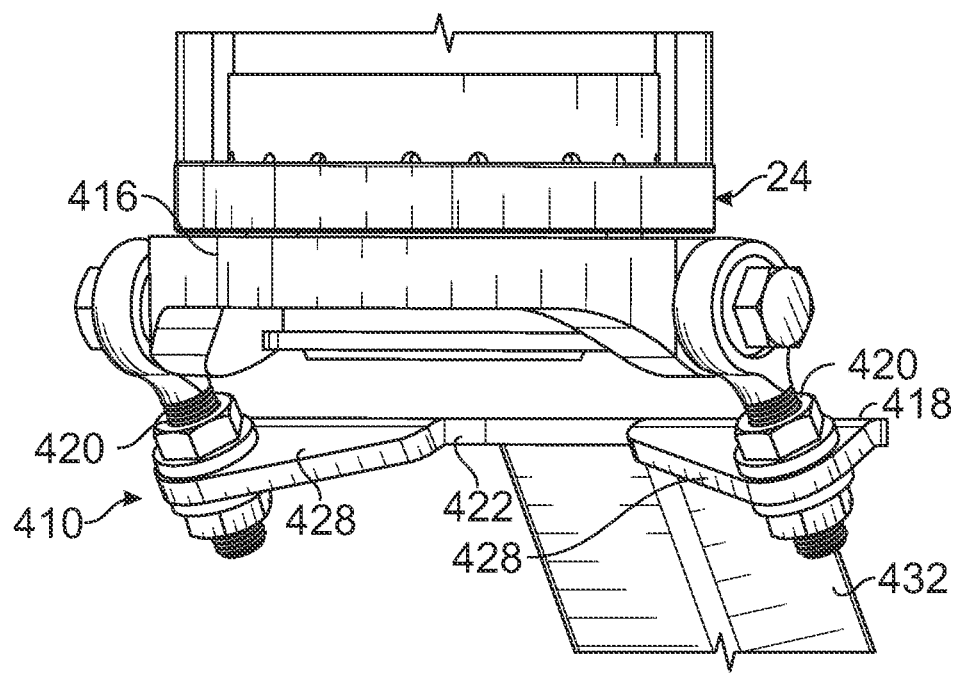
FIG. 41 is a front elevation view of valve operating machine having a torque management system of FIG. 38 mounted thereto.

The foot 414 is a rigid and elongated member. The foot 414 can be secured to the lower end of the first member 430 as shown in FIGS. 39 and 40. The foot 414 may be secured to the first member 430 by a lock 436 which may be a spring-loaded button, a fastener or the like. The foot 414 can be detached from the lower end of the first member 430, and secured to a retainer 438 extending from the first member by a lock which may be a spring-loaded button, a fastener or the like. When the foot 414 is attached to the retainer 438, the foot 414 preferably seats flush against the first member 430.

The ring lock 312 and the split retaining snap ring 314 are secured to the upper plate 416 in an identical manner to that described in the assembly of the torque arm assembly 308 to form the completed stand assembly 400.

In use, the operator carries the valve operating machine 20 from the truck to the jobsite. The torque arm assembly 308 may be attached to the base 24 and the output socket 148 in the storage position when the valve operating machine 20 is removed from the truck. The stand assembly 400 is carried separately in the other hand of the operator, or in a second trip to the truck. If the torque arm assembly 308 is attached to the base 23 and the output socket 148, the torque arm assembly 308 is detached from the base 24 and the output socket 148 and put to the side. The stand assembly 400 is then attached to the valve operating machine 20.

To assemble the stand assembly 400 with the base 24 and the output socket 148, the upper plate 416 is positioned under the base 24 such that the upper surface 318c of the upper plate 416 is under the base 24. The pin 342 aligns with passageway 372, and the pin 344 aligns with passageway 374. The ring lock 312 is rotated relative to the upper plate 416 such that projections 368, 370 on the ring lock 312 are misaligned with the projections 390, 392 on the output socket 148 and the spring-loaded ball 334, 336 are within the indentations 358", 360". The stand assembly 400 is then pushed upward over the third and fourth sections 380, 382 of the output socket 148 until the upper surface 310c of the upper plate 416 engages with the lower surface 24d of the base 24 and the shoulder 388 of the output socket 148. Thereafter, the ring lock 312 is rotated relative to the upper plate 416 by the operator grasping the tab 362 which causes the spring-loaded balls 334, 336 to move out of the indentations 358", 360" and into the indentations 358', 360'. This provides a tactile feel for the operator. This also causes the projections 368, 370 on the ring lock 312 to move into the pockets 394, 396 formed between the projections 390, 392 and the shoulder 388 of the output socket 148. The central axis 46 of the base 24 and the central axis 316 of the upper plate 416 are parallel to each other. As a result, the stand assembly 400 in locked into the operational position.

The foot 414 may be attached to the first member 430 before or after attachment of the upper plate 416 and the ring lock 312 to the base 24 and output socket 148. In the operational position, the first member 430 of the leg assembly 412 is not underneath the base 24. This provides a space for an operator to stand between the leg assembly 412 and the base 24.

In use, the operator positions the valve operating machine 20 over the valve 22 to be exercised. The key 152 is inserted into the output socket 148 and the height of the key 152 and the height of the leg assembly 412 are adjusted so that the valve operating machine 20 is at an ergonomic height for the operator and the foot 414 is against the ground. Once positioned, the operator grasps both handles 26, 44 and engages the start button 290. If desired, the operator can stand on the foot 414. With the thumb of the one hand, the operator controls the rotation of the key 152 to exercise the valve 22 by toggling the control switch 266. The display 42 is easily viewable by the operator since the display 42 is not blocked from view by the handle 44. In addition, because the operator's hand is over the display 42 when grasping the handle 44, the operator's hand can block the sun from shining onto the display 42 for better viewing of the display in sunny conditions. The first and second handles 26, 44 are spaced apart from each other at a sufficient distance so that the operator can easily steady the valve operating machine 20 during use. The stand assembly 400 assists in counteracting any torque generated by the valve operating machine 20.

To remove the stand assembly 400 from the base 24 and the output socket 148, the ring lock 312 is rotated relative to the upper plate 416 by the operator grasping the tab 362 which causes the spring-loaded balls 334, 336 to move out of the indentations 358', 360' and into the indentations 358", 360". This provides a tactile feel for the operator. This also causes the projections 368, 370 on the ring lock 312 to move out of the pockets 394, 396 formed between the projections 390, 392 and the shoulder 388 of the output socket 148. Thereafter, the stand assembly 400 is pulled downward from the base 24 and the output socket 148.

The Abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While various embodiments of the disclosure have been described, it will be apparent to those of ordinary skill in the art that other embodiments and implementations are possible within the scope of the disclosure. Accordingly, the disclosure is not to be restricted except in light of the attached claims and their equivalents.

The invention claimed is:

1. A valve operating machine comprising:
   a base;
   a housing on the base;
   a motor within the housing;
   an output socket rotatably coupled to the housing and extending through the base, the output socket being rotatable relative to the base when the motor is actuated, wherein a key that is used to exercise a valve can be connected to the output socket;
   a ring lock rotatably coupled to the output socket;
   a locking assembly which locks the ring lock to the output socket and can be released to allow removal of the ring lock from the output socket;
   a plate rotatably coupled to the ring lock; and
   a mating assembly configured to couple the plate to the base in at least two positions, while preventing rotation of the plate relative to the base.

2. The valve operating machine of claim 1, wherein the locking assembly includes a projection which can be moved into a pocket.

3. The valve operating machine of claim 2, wherein a pair of projections and a pair of pockets are provided.

4. The valve operating machine of claim 2, wherein the projection is on the ring lock and the pocket is in the output socket.

5. The valve operating machine of claim 1, wherein the mating assembly includes a pin that seats within one of a pair of holes.

6. The valve operating machine of claim 1, wherein the mating assembly includes a pair of pins that seats within a pair of holes.

7. The valve operating machine of claim 6, wherein the pins extend from the plate and the holes are in the base.

8. The valve operating machine of claim 1, wherein the plate is an elongated arm.

9. The valve operating machine of claim 8, wherein the elongated arm has a handle at and end.

10. The valve operating machine of claim 1, wherein the plate has an elongated leg attached thereto which can be rested on the ground.

11. The valve operating machine of claim 10, further comprising a foot attached to an end of the leg.

12. The valve operating machine of claim 11, wherein the foot is removably attached to the plate.

13. The valve operating machine of claim 1, further comprising a spring-loaded ball which is configured to seat within each of a pair of indentations, the spring-loaded ball being provided in one of the ring lock and the plate and the indentations being provided in the other of the ring lock and the plate.

14. The valve operating machine of claim 13, wherein the indentations are positioned 90 degrees apart from each other.

15. The valve operating machine of claim 13, wherein the indentations are in the ring lock and the spring-loaded ball is in the plate.

16. The valve operating machine of claim 1, further comprising a pair of spring-loaded balls which are configured to seat within two pairs of indentations, the spring-loaded balls being provided in one of the ring lock and the plate and the indentations being provided in the other of the ring lock and the plate.

17. The valve operating machine of claim 16, wherein each indentation is positioned 90 degrees apart from each other.

18. The valve operating machine of claim 1, wherein the motor is coupled to the output socket by gearing, the gearing being positioned within a gear housing, wherein the gear housing is seated within a pocket formed in an upper surface of base, the pocket having a plurality of square-shaped recesses, wherein square-shaped projections extending down from the housing seat within the recesses.

19. The valve operating machine of claim 1, further comprising a snap ring attaching the ring lock to the base.

20. The valve operating machine of claim 1,
    wherein the locking assembly includes a projection which can be moved into a pocket; and
    wherein the mating assembly includes a pin that seats within one of a pair of holes.

21. The valve operating machine of claim 20, further comprising a pair of spring-loaded balls which are configured to seat within two pairs of indentations, the spring-loaded balls being provided in one of the ring lock and the plate and the indentations being provided in the other of the ring lock and the plate.

* * * * *